(12) United States Patent
Bjerregaard et al.

(10) Patent No.: US 7,232,032 B2
(45) Date of Patent: *Jun. 19, 2007

(54) METAL PACKAGING

(75) Inventors: Jan Bjerregaard, Risskov (DK);
Mazyar Abolfazlian, Aarhus C (DK);
Esad Zubcevic, Vejle (DK); Poul Mikkelsen, Løsning (DK); Christian Ørum, Kolding (DK); Torsten Brix, Kolind (DK); Niels Toft Jorgensen, Løsning (DK)

(73) Assignee: Glud & Marstrand A/S, Losning (DK)

( * ) Notice: Subject to any disclaimer, the term of this patent is extended or adjusted under 35 U.S.C. 154(b) by 0 days.

This patent is subject to a terminal disclaimer.

(21) Appl. No.: 11/080,772

(22) Filed: Mar. 15, 2005

(65) Prior Publication Data

US 2005/0279657 A1 Dec. 22, 2005

Related U.S. Application Data

(62) Division of application No. 10/513,648, filed on Nov. 5, 2004, now Pat. No. 7,051,872.

(30) Foreign Application Priority Data

Apr. 14, 2004 (DK) ............................... 2004 00589

(51) Int. Cl.
*B65D 85/57* (2006.01)
(52) U.S. Cl. .................. 206/308.1; 206/312; 206/472; 220/62.11; 220/62.22

(58) Field of Classification Search ............. 206/308.1, 206/310, 312, 493, 472; 220/62.11, 62.16, 220/62.22, 847, 4.23, 4.22; 16/225, DIG. 13
See application file for complete search history.

(56) References Cited

U.S. PATENT DOCUMENTS 4,471,881 A 9/1984 Foster (Continued)

FOREIGN PATENT DOCUMENTS

EP 0 576 256 12/1993

(Continued)

*Primary Examiner*—David T. Fidei
(74) *Attorney, Agent, or Firm*—Day Pitney LLP

(57) ABSTRACT

A packaging comprising a first and second outer part of metallic material, an inner part of non-metallic material made in one piece and comprising a first and second opposed side between which an element can be stored and a hinging part forming at least one hinge connecting said sides and allowing the sides to be rotated relative to each other within an angle so as to open the packaging and adapting the packaging and adapting the packaging for packing in an automated packing machine. At least a part of a perimeter of the first and second outer part is adapted to retain the inner part in order to attach said outer parts to said respective sides of said inner part for covering substantial part of the outer surfaces of the sides.

19 Claims, 18 Drawing Sheets

U.S. PATENT DOCUMENTS

| | | | |
|---|---|---|---|
| 4,634,019 A | 1/1987 | Pherigo | |
| 4,714,157 A | 12/1987 | Morrone | |
| 4,722,439 A | 2/1988 | Grobecker et al. | |
| 5,284,242 A | 2/1994 | Roth et al. | |
| 5,477,961 A | 12/1995 | Taniyama | |
| D385,145 S | 10/1997 | VerWeyst et al. | |
| 5,676,272 A | 10/1997 | Baerenwald | |
| 5,725,105 A | 3/1998 | Boland | |
| 5,769,217 A | 6/1998 | Derraugh et al. | |
| 5,782,371 A | 7/1998 | Baerenwald et al. | |
| 5,788,068 A | 8/1998 | Fraser et al. | |
| 5,829,583 A | 11/1998 | VerWeyst et al. | |
| 5,887,713 A | 3/1999 | Smith et al. | |
| 5,908,109 A | 6/1999 | Muto | |
| 5,984,094 A | 11/1999 | Frick | |
| 6,016,909 A | 1/2000 | Chang | |
| 6,041,922 A | 3/2000 | Kollinek | |
| 6,065,594 A | 5/2000 | Sankey et al. | |
| 6,109,454 A | 8/2000 | Stangebye-Hansen | |
| D434,777 S | 12/2000 | Peterson et al. | |
| D437,520 S | 2/2001 | Choi | |
| 6,196,384 B1 | 3/2001 | Belden, Jr. et al. | |
| 6,199,689 B1 | 3/2001 | Higuchi et al. | |
| D440,108 S | 4/2001 | Derman | |
| 6,220,431 B1 | 4/2001 | Käser | |
| 6,227,362 B1 | 5/2001 | Cheung | |
| 6,276,524 B1 | 8/2001 | Cerda-Vilaplana et al. | |
| D450,973 S | 11/2001 | Bieda | |
| D451,299 S | 12/2001 | Cheng | |
| D451,747 S | 12/2001 | Tang | |
| D452,104 S | 12/2001 | Tang | |
| D452,105 S | 12/2001 | Chan | |
| D455,595 S | 4/2002 | Ikeda et al. | |
| 6,375,003 B1 | 4/2002 | Lethen et al. | |
| 6,431,352 B1 | 8/2002 | Khosla | |
| 6,478,150 B1 | 11/2002 | Solling | |
| D468,621 S | 1/2003 | Farrar et al. | |
| 6,502,694 B1 | 1/2003 | Pijanowski et al. | |
| 6,561,347 B1 | 5/2003 | Lax | |
| 6,715,607 B2 | 4/2004 | Wetsch | |
| 2002/0020641 A1 | 2/2002 | Cha et al. | |
| 2002/0056654 A1 | 5/2002 | Carman et al. | |
| 2003/0015441 A1 | 1/2003 | Kang et al. | |
| 2003/0062276 A1 | 4/2003 | Chung | |
| 2004/0020801 A1 | 2/2004 | Solling | |
| 2004/0045845 A1 | 3/2004 | Fraser et al. | |

FOREIGN PATENT DOCUMENTS

| | | |
|---|---|---|
| EP | 0 671 743 | 3/1995 |
| EP | 0 744 746 A2 | 11/1996 |
| EP | 0 744 746 A3 | 11/1996 |
| EP | 0744746 | 11/1996 |
| EP | 0 789 914 | 8/1997 |
| EP | 0 866 458 | 9/1998 |
| EP | 0 874 768 | 11/1998 |
| EP | 0 895 243 A1 | 2/1999 |
| EP | 0895243 | 2/1999 |
| EP | 1 083 569 | 3/2001 |
| EP | 1 100 088 | 5/2001 |
| EP | 1 107 257 | 6/2001 |
| FR | 2 753 297 | 5/1999 |
| GB | 2 243 145 | 10/1991 |
| GB | 2 243 145 A | 10/1991 |
| JP | 08102178 | 4/1996 |
| JP | 2002 104563 A | 4/2002 |
| NL | 1000324 | 11/1995 |
| WO | WO 96/35628 | 11/1996 |
| WO | PCT/IB00/00069 | 1/2000 |
| WO | WO 00/49619 | 8/2000 |
| WO | WO 00/74057 | 12/2000 |
| WO | WO 01/96212 | 12/2001 |
| WO | WO 03/023783 | 3/2003 |

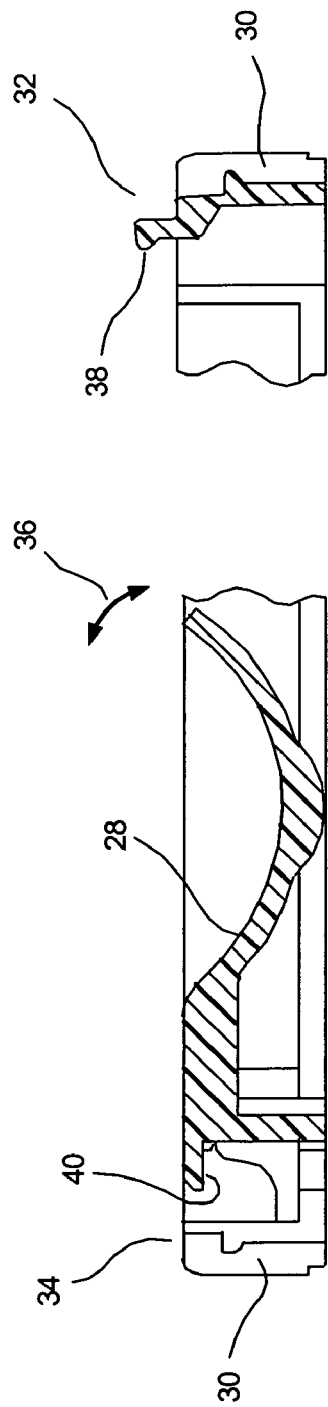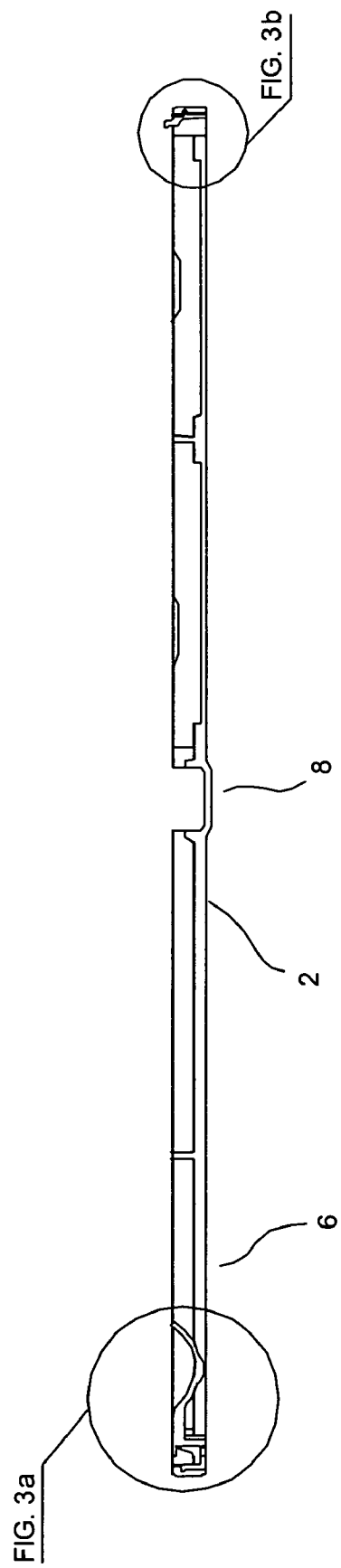

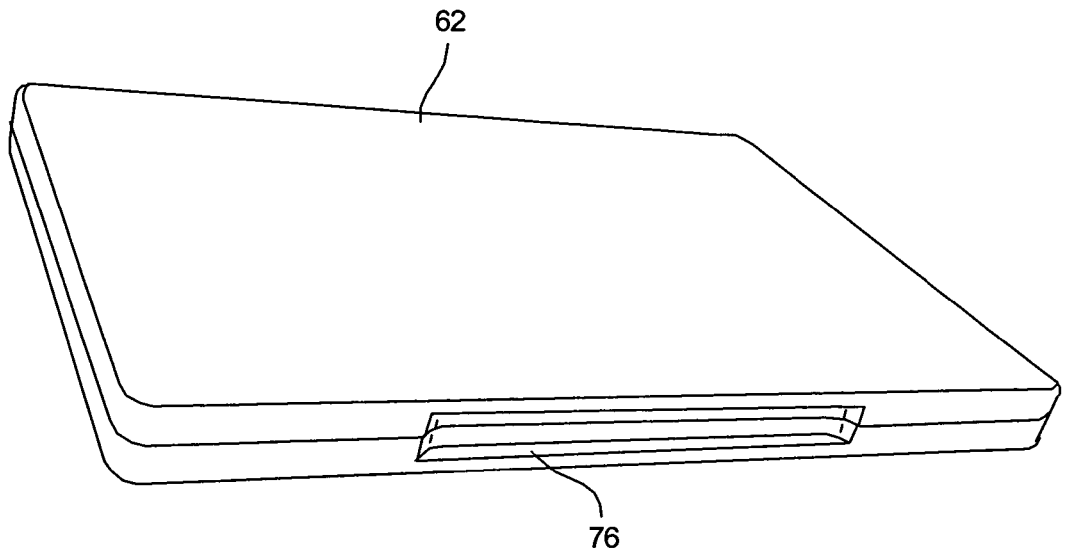
F I G. 14
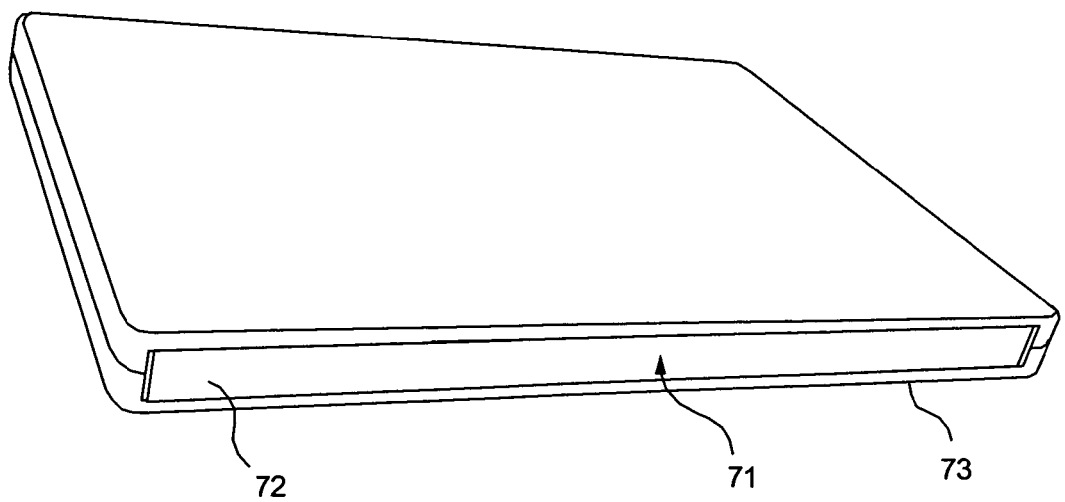
F I G. 15

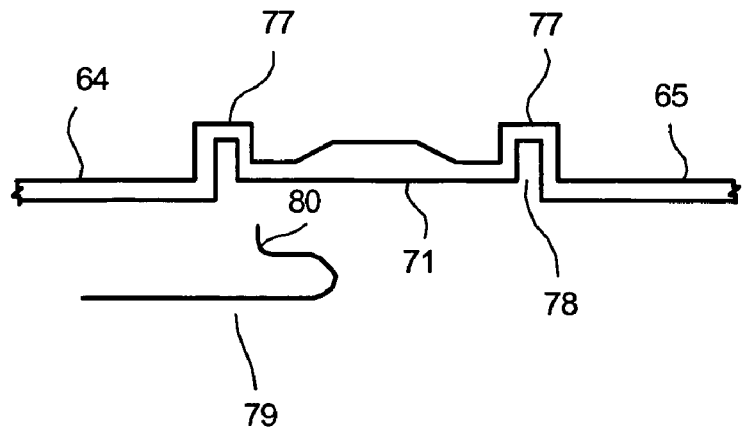
F I G. 21
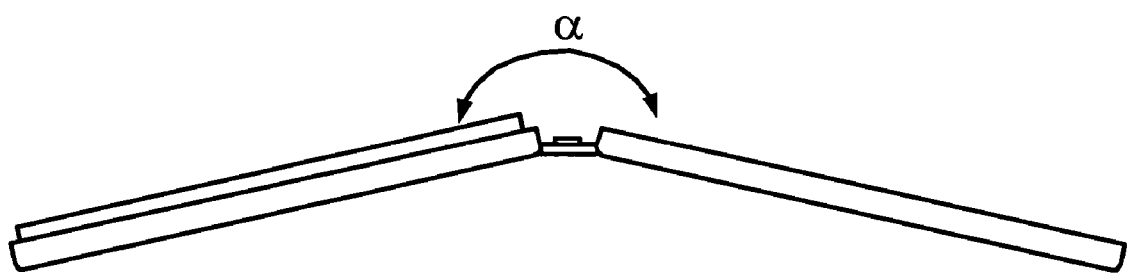
F I G. 24

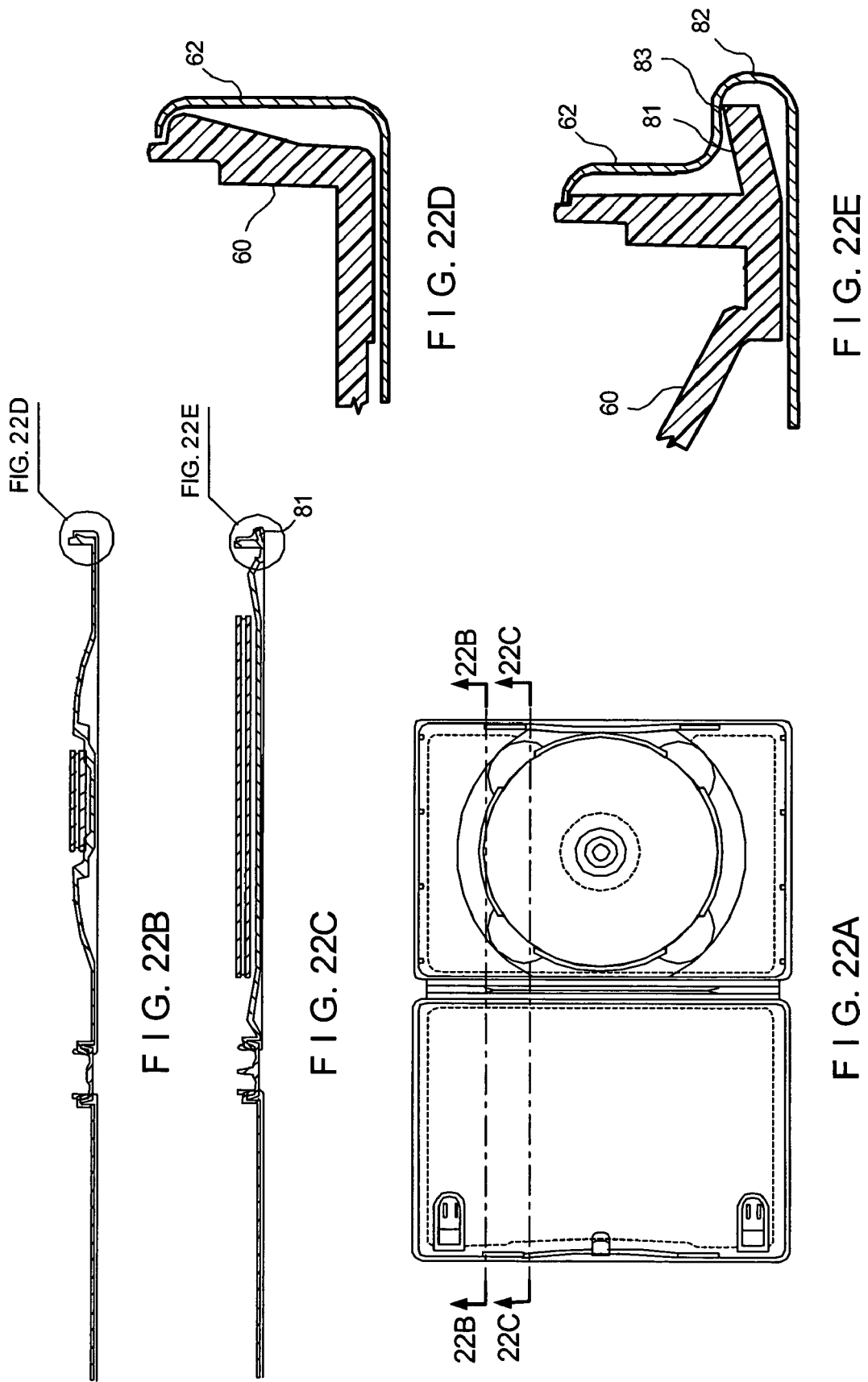

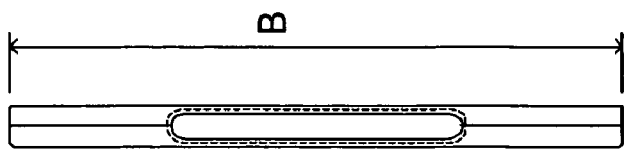
F I G. 23B
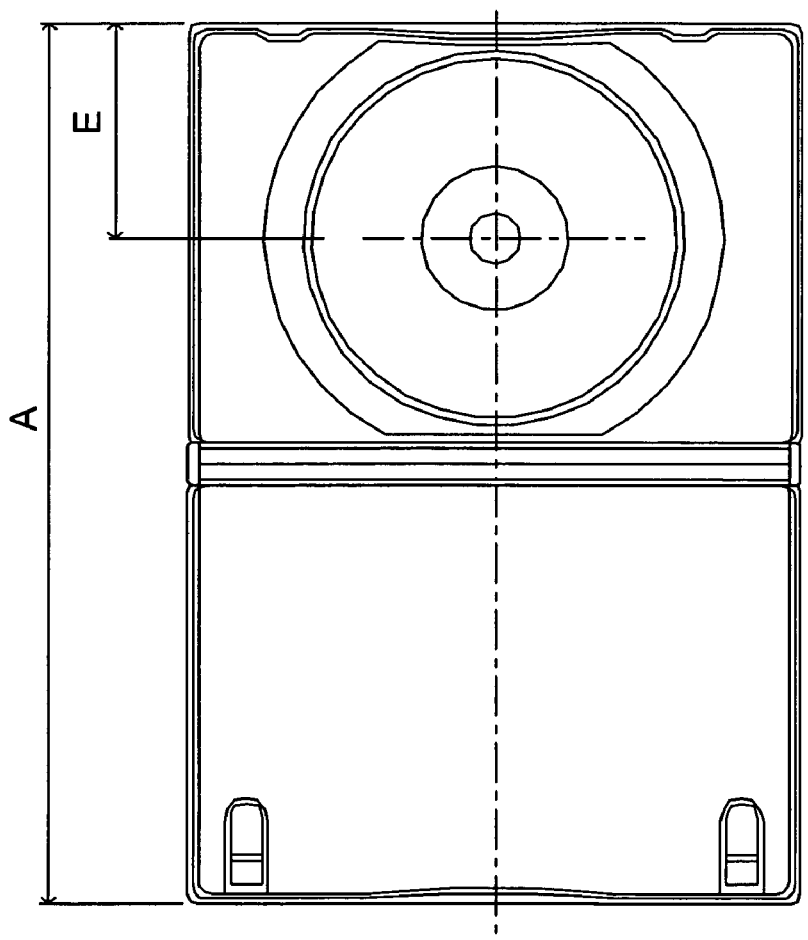
F I G. 23A
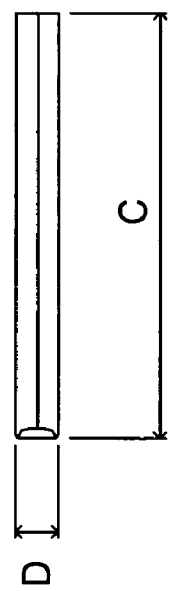
F I G. 23C

METAL PACKAGING

This application is a divisional application of U.S. patent application Ser. No. 10/513,648, filed Nov. 5, 2004 now U.S. Pat. No. 7,051,872.

FIELD OF THE INVENTION

The present invention relates to metal packaging for storing elements, such as data-carrying elements like Compact Discs or DVDs, which packaging is adapted to be packed in automated packing machines for plastic packaging.

BACKGROUND OF THE INVENTION

The CD and DVD industries have for decades invested substantial sums of money in developing metal packaging. However, all these many efforts have not led to metal packaging, which is capable of being packed in the standard automated packing machines commonly used in these industries for plastic packaging.

The total sum of investments in such automated packing machinery is huge and the total number of packaging, produced in the CD- and DVD-industries, exceeds 5 billion pieces per year.

Metal as a component of packaging for CDs, DVDs and other forms of media gives a large number of advantages, including supplying the packaging with substantially additional strength and giving an exclusive look. Further advantages are that it is possible to emboss a surface relief directly onto the surface and that it is easier to print on metal surfaces.

However, as stated the CD- and DVD-industries have not been able to provide a packaging that utilises these advantages, combined with the ability of being packed in the automated packing machines in the industries. The packing machines require that the packaging is openable like a book with an angle of more than 180°, preferably 240°. An example of such a packing machine is shown in FIG. 25.

The common plastic CD- and DVD-packaging can be bent in that angle which is needed in the process of inserting a printed paper cover between the actual packaging and the transparent foil wrapped around it. When the plastic packaging is bent 240° the transparent foil and the packaging will separate and thus make space for the insertion of the printed paper cover. The reason for this ability is that CD- and DVD-plastic packaging has a hinge, which enables the sides of the packaging to be rotated relative to each other in order to open the packaging with an angle of, in principle, 360°.

Metal packaging developed so far does not have this ability, as such packaging cannot be opened like a book with an angle of more than 180°, preferably 240°. Such as packaging is shown in FIG. 24.

The challenge has thus been to achieve that metal packaging will be able to "act" like or emulate a plastic packaging in the automated packing machines, e.g. that the metal packaging may be opened like a book with an angle of more than 180°, preferably 240°.

The demand in the market for such packaging is overwhelming, but the technical challenges even bigger. The reason for this is, as stated, that such packaging must be able to integrate different materials, i.e. metal and e.g. plastic. This requires that focus has to be put on the tolerances allowed when metal and plastic has to cooperate.

Until now no one has succeeded in creating the metal packaging, which is "perceived" by the automated packing machines as plastic packaging, i.e. which allows the metal packaging to open with an angle of more than 180°, preferably 240° while still ensuring that the metal may cooperate, e.g. plastic.

Packaging adapted to store data carrying elements like CDs and DVDs are known in the art.

EP 0 576 256 B1 discloses a package structure for a recording medium or other items and which is composed of a plastic support frame and a laminated flexible body.

EP 744 746 and EP 874 768 discloses systems comprising metal. However, these packaging systems can not be designed like a book due to the characteristics of the metal material.

U.S. Pat. No. 6,431,352 discloses a holder for CD's or DVD's including a plastic molded container sized to accommodate the disc. Along a side of the container on an inner wall thereof is a living hinge. The disc is removed from or inserted into the holder by pressing against the sides of the container so that a slit widens into a gap through which gap the disc can pass. The sides of the holder cannot be separated.

WO 96/35628 discloses a composite package for use in storing a laser or optically readable disc. The package includes a lightweight frame for storing the disc, and the frame is encompassed by a sheath, which is securely bonded to an exterior surface of the frame. The frame is made of plastic and the sheath is made of a suitable flexible material, such as paperboard, as it forms part of a hinge that requires high flexibility.

Other documents relating to storage/packing of media are U.S. Pat. No. 6,220,431, EP 0 895 243, U.S. Pat. No. 4,714,157, U.S. Pat. No. 5,908,109, U.S. Pat. No. 6,375,003, U.S. Pat. No. 5,725,105, EP 0 671 743, WO 03/023783, EP 1 100 088, WO 00/74057, FR 2 753 297, U.S. Pat. No. 4,722,439, U.S. Pat. No. 5,477,961, EP 0 866 458, U.S. Pat. No. 5,788,068, U.S. Pat. No. 6,502,694 and U.S. D437,520.

The common characteristics of these systems is that they can not be designed like a book with the ability to open with an angle of more than 180°, preferably 240° due to the characteristics of i.a. the metal material and thus cannot be packed in the automated packing machines.

It is an object of the present invention to provide a metal packaging, which overcomes the above mentioned disadvantages.

Thus, it is an object of the present invention to provide a metal packaging which is adapted for and can be packed in traditional automated packing machines in order to avoid the need for investing additional, very substantial sums of money in the development and implementation of new automated packing machines.

It is a further object of the present invention to provide packaging for CD or DVD's having an improved strength and more exclusive look than known packaging.

DESCRIPTION OF THE INVENTION

Generally, in order to achieve the above mentioned objectives a packaging consisting of outer metal parts attached to an inner part of non-metallic material with a hinge for opening the packaging is provided. This provides the freedom of design known from non-metal material, such as plastic, and the strength and exclusivity of metal, while still allowing the packaging to be packed in automated packing machine assemblies.

Thus, according to a first aspect, the present invention relates to a packaging comprising;

a first and second outer part of metallic material, an inner part of non-metallic material made in one piece and comprising;

a first and second opposed side between which an element can be stored, a hinging part forming at least one hinge connecting said sides and allowing the sides to be rotated relative to each other within an angle so as to open the packaging and adapting the packaging for packing in an automated packing machine, at least a part of a perimeter of the first and second outer part being adapted to retain the inner part in order to attach said outer parts to said respective sides of said inner part for covering a substantial part of the outer surfaces of the sides.

Preferably, the width of the packaging is between 134 mm and 138 mm, and the length of the packaging is between 188 mm and 194 mm when packaging is in a closed condition.

The width of the packaging is preferably between 280 mm and 286 mm in an open condition where the sides are rotated 180° relative to each other.

The hinge preferably allows the sides to be rotated relative to each other within an angle of 180° or more, such as 190° or 200° or 210° or 220° or 230° or 240° or more than 240°.

The inner part of the packaging is preferably made in one piece comprising a first side and a second side interconnected by a hinging part, which may comprise one or more hinges provided in groups or evenly distributed.

The first and second side together defines a cavity in which the element can be stored. This provides the possibility of opening and closing the packaging like a book with an angle of more than 180°, preferably 240°, which is essential in order to be packed in automated packing machines, which require that the two sides of the packaging must be opened like a book within an angle of more than 180°, preferably 240°. This is possible for the packaging according to the invention, as the inner part and hinging part may be made of a flexible material, such as a flexible plastic, enabling the sides to be bend backwards in an angle of more than 180°, preferably 240°.

At least a part of a perimeter of the first and second outer parts may be adapted to retain the inner part. At least a part of the perimeter of the first and second outer parts may comprise a curled edge portion and/or a flange extending transverse to a plane defined by a middle part of the parts. Accordingly, the inner part may be pressed into the first and second outer parts and in order to be removed it must pass the curled edge portion. It may be possible to provide the bend portion and the curled edge portion by means of a punching machine or a deep drawing machine. Such machines provide the possibility of making a part wherein at least a part of the perimeter of the part comprises said curled edge portion and/or a flange extending transverse—or any other area of the part. Said curl portion may be provided by step(s) of rolling the edge. The rolled curl portion may extend around the entire perimeter of the outer part(s) depending on the radius of curvature of the corners.

The curling of the outer part(s) ensure(s) that there are no sharp edges contrary to known metal packaging.

In a preferred embodiment, the outer parts comprise shell-like members consisting of a middle part having upwardly extending sidewall(s) so that the inner part is pressed into said shells. Preferably, the sidewall(s) terminate in a curled or slightly bend edge portion that is adapted to grip around corresponding edges of the inner part so as to retain the inner part.

The packaging is preferably quadrangular, and the shell-like members comprise upwardly extending sidewalls on at least three edges so that the shell substantially surrounds the sides of the inner part on at least three sides.

In an embodiment, the first and second sides comprise indentations along a perimeter for receiving corresponding protrusions provided on said outer parts so as to provide the attachment between said sides and said parts. Thus, the first and second part may be attached to the inner part by clicking them on.

The first and second part may be U-shaped such that the legs of the "U" define sidewalls of the parts, said sidewalls may comprise the protrusions for attaching them to the inner part.

Alternatively or additionally, the inner part may be attached to the first and second part by means of glue and/or welding and/or at least one snap-lock.

The inner part may be integrated with the first and second parts by means of inject-moulding. Thus the inner part may be moulded around the first and second part. This may be done by means of insert-moulding wherein the outer parts are placed in the tool in which the moulding is taking place.

Other production processes may be suitable, such as blow-moulding, extrusion or thermo-moulding, depending on the desired design.

The first and second parts may be riveted or screwed to the inner part depending on e.g. the type of advertisement that is preferred.

The outer parts may cover a part of or the whole outer surface of the inner part. In a preferred embodiment, the outer parts substantially cover all the outer surfaces of the inner part. In the embodiment where the outer parts is U-shaped, they only cover a central part and two sides of the inner part.

It is preferred that the packaging can be closed in only one step not needing any "post squeezing" on the locking parts. Therefore, the locking part(s) are preferably arranged close to indentations, that is used to open and close the packaging like a book, in order to reduce the amount of force to close and to make sure that the packaging is closed in one step. Further, the outer part may be substantially thick and/or comprise reinforcement ribs in order to provide a more stiff cover that does not wrench when closing or opening the packaging.

The edge portion of the first and second part may extend around the entire edge of each of the two sides of the inner part, inclusive said indentations used for opening. Thus, the indentations may be formed in metal in order to provide a strong and stiff handgrip.

The inner part may comprise one or more locking pins provided as protrusions so as to lock the first and second part to the inner part. Said pins are preferably provided on the inner part at a location adjacent to said indentations of the first and second part (when these parts are attached to the inner part). Thus, the pins may engage an edge portion of the first and second part, respectively, in order to provide a lock there between, and thus prevent that the first and second parts detach from the inner part by accident.

In particular, a metal edge portion may be provided on the outer parts and which extends along the sides of the two sides of the inner part, which constitute the back edge of each side, i.e. the edge near the hinge area.

A back part of the inner part may compose the hinging part between the two sides, and the back part may be covered by a metal part/layer. The back edge is preferably displaced inwards towards to internal area of each two sides of the inner part so that the back part be on level with the outermost edge of the back side of the packaging when the packaging is closed. The metal part/layer covering the back part may be glued thereto. Alternatively or additionally, the metal part/layer may comprise slips that may be bent around an upper and lower edge of the back part in order to attach the metal part/layer. Edges of the metal part/layer may be bent or curled so as to reinforce its stiffness. The metal part/layer may be attached to the back part by insert moulding and/or click-on means.

In a preferred embodiment, the hinging part comprises two hinges, one for each side of the inner part. Preferably, the hinges each defines a groove extending inwardly on the backside of the packaging, the grooves being provided for clicking first and second outer parts onto the inner part, as protrusions on each outer part may enter and engage the grooves, respectively. Also the above-mentioned metal layer/part covering the back part may be attached to the back part by click on. Preferably, the grooves extend along the entire length of the hinges so that a corresponding curled or bent edge defining the protrusions on the outer parts and metal layer/part may extend along the entire length thereof, which reinforces the parts/layer.

Furthermore, the grooves provides that any sharp edges on said outer parts and metal part/layer may be hidden or surrounded by said groove, and thus no sharp edges can be seen and touched.

When opening the packaging with an angle of 180°, the level of the back part between the two hinges is preferably higher than the level of the two sides of the inner part. Thus, the back part is displaced inwards in relation to the sides. This embodiment provides that the back part may be displaced more inwards towards the internal of the packaging when the packaging is closed, which then increases the strength and provides a more smooth finish where the inner part is better covered by the outer metal parts. The described embodiment is shown in FIG. 21.

When attaching the metal part/layer to the back part the combining of two materials requires certain precautions such as choosing the adequate means of attachment such as an adhesive such as glue and facilitating the co-operation of the two materials.

In a preferred embodiment the metal part/layer is thus not covering the whole of the back part, and thereby allowing the back part to change dimensions without the metal part/layer becoming inadequately sized, and the means of attachment such as an adhesive such as glue is choozen from a range of means, which are capable of absorbing the different reactions of the two materials under various circumstances such as climatic circumstances.

Preferably, the means of attachment is a glue, which may be "double-sided" adhesive such as TESA 4965 and/or 3M 9088FL. However, any glue or other adhesive, which are capable of absorbing the different reactions of the two materials under various circumstances may be used.

In another embodiment, the back part may be labelled by in-mould labelling.

Preferably, the packaging comprises guiding members for providing that the step of closing is done in a controlled manner avoiding the two sides of the packaging from displacing in relation to each other. The guiding members may comprise a male member having a tapered end (such as a conical end) that engages into a female member. Said guiding members may be positioned in the corners of the inner part, so that they also provide a reinforcement of the corners of the packaging. Thus, the corners of the first and second outer part may not be dented if the packaging is dropped.

In another embodiment, the guiding members are provided adjacent to the corners first meeting each other when closing the packaging. The guiding members comprise one or more protrusions provided on one of said sides and being of adapted to engage grooves provided on the opposite side.

Preferably, there is a space between the inner part and the first and/or second outer part (such as 0.5 mm) so as to provide space for an inwardly extending embossing relief in the inner side(s) of the outer part(s) and/or an outwardly extending embossing relief in the outer side(s) of the inner part(s). The space may be obtained by countersinking at least a part of the inner part when moulding it. If an embossing relief must extend outwardly in the outer part, then the part containing said relief might be countersunk prior to emboss so that the packaging can be stacked on each other though embossing is provided in the surface.

There may also be an embossing relief on the inner sides of the inner parts.

The inner part and/or the first and/or second outer part may serve as a lock adapted to lock the book-like packaging. This lock may be operable with one hand or two hands may be used to open the book and thereby unlock the packaging. The inner part of the packaging may be provided with a locking part such that the first and second side may be locked together. Such a locking part may comprise magnets, which hold the first and second side together. In other embodiments the locking part is a snap-lock or a lock which requires a key or a lock which only can be opened once where after it can not be locked again. The locking parts may comprise a male locking member engageable with a female locking member.

The first and second outer part may cover at least the central part of the outer surface of the inner part, and the outer surface of the inner part may comprise recesses having a shape and depth substantially corresponding to the shape and thickness of the outer parts, respectively. Thus, the outer parts may be attached to the inner part so that the outermost surface of the outer part is levelled with the outermost surface of the inner part.

The shape of the first and second outer parts are preferably provided by bending or extruding or deep drawing.

The inner part may comprise one or more protrusions extending inwardly in the packaging. Protrusions may be provided on one side of the inner part, and which pushes the element(s) towards an opposite side of the inner part, when the packaging is closed. Thus, the element is even more fixated in the packaging. Preferably, the protrusions are positioned on the inner part in the hinge area and also in the area near the edge of the inner part near the locking parts.

The first and second outer parts comprise a metallic material. E.g. the outer part may be a composite comprising reinforcing metal elements and/or fibre material. In some embodiments the outer parts are all made of the same material while in other embodiments the outer parts are each made of a different material. E.g. the outer part may be made of a metal and/or alloy comprising aluminium and/or bronze and/or steel and/or stainless steel and/or iron and/or magnesium and/or titanium and/or copper and/or nickel and/or zinc and/or silver and/or gold and/or platinum and/or sheet metal and/or tinplate or a combination hereof.

A layer of metallic or non-metallic material may be provided on the outer part(s) which in such embodiments may be made of foil, cardboard, paperboard, veneer, polymer, textiles or laminates of foil.

One embodiment may comprise a metal layer on the outside of the packaging. As an example the layer may be a gold layer having a decorative effect. The metal layer may be polished or grinded.

The inner and/or outer surface of the first and second parts could in some embodiments be covered/coated by a protective layer and/or a decorative layer e.g. comprising colours. The protective layer may be in contact with the outer parts or it may be in contact with the decorative layer. The protective layer and/or the decorative layer may cover the whole and or a part of the inner and/or outer surface. The layer may be metallic or non-metallic.

The inner part comprises a non-metallic material. E.g. the inner material may be made of paper and/or cardboard and/or rubber and/or wood and/or leather and/or silicone and/or plastic (polymer), such as PP, PA, PMMA, PC, PELD, PEHD, PET or elastomers or polymers or rubber or any combination thereof.

In some embodiments the inner part may comprise one part made of one plastic or other non-metallic material while another inner part—e.g. the hinging part—is made of another non-metallic material such as polypropylene.

The element may be welded together with at least a part of the inner part and/or the first and/or second outer part(s). Thus in order to use the element for the first time the welded area must be raptured and this makes it possible to see that the element had been used at least once. The packaging may comprise one or more boxes.

At least a part of the inner part may be shaped so as to engage at least a part of the at least one element in the packaging. E.g. a part of the inner part may have the same or substantially the same shape as the element such that the element fits into the inner part. The shape of the inner part may be the complementary shape of the element, i.e. if the element has a round shape, then a round hole may be provided a part of the packaging and the round shape then fits into the round hole.

When the element is placed in the packaging it can then be fixated such that it does not move around in the packaging when said packaging is moved from one place to another or when the packaging is shaken. The inner part and/or the first and second outer parts may comprise means adapted to engage the element by means of snap-locks or other locks. Such other locks could be locks, which require a key in order to lock and/or un-lock. The lock could also be of the kind, which must be partly damaged in order to remove the element. This makes it possible to see if the element has ever been removed from the packaging. In some embodiments the element may be replaced while in others it is not possible to replace the element.

In one embodiment at least a part of the inner part is shaped so as to retain at least one element in the packaging in a predetermined position. The inner element could be shaped such that only a part of the element is retained in a predetermined position. E.g. the inner part may comprise a round protruding element which is adapted to engage a round hole in the element. Such an element could be a CD and/or a DVD or any other data-carrying element having a similar hole and shape or any other data-carrying element.

The inner part of the packaging may comprise an retaining member adapted to be moved between an retaining position wherein it retains the element in a predetermined position and a non-retaining position wherein the element is not retained. The retaining member may be shaped such that it engages a hole in the element. Thus the retaining member may have a shape which is complementary the shape of the sides of the hole, i.e. if the hole is circular then the retaining member may comprise two parts which are shaped as half-circles. When an object or a finger applies pressure to the two half-circles the retaining member may be moved out of engagement as it is moved into the non-retaining position. When the retaining member is in the non-retaining position, the element may be removed.

The inner part may comprise more than one retaining member, such as one on each of the sides of the inner part. Thus, the packaging may store one, two, three or more elements, such as CD's or DVD's.

In another embodiment, the inner part may comprise a retaining member having a plurality of retaining taps adjacently arranged on a circle and surrounding a "release tap" and adapted to engage the edge of a hole of a CD or DVD. The taps are positioned elevated in relation to the inner part, so that the taps may disengage said hole by pushing downwards on the release tap and thereby releasing the CD or DVD from the taps. Preferably, the taps are adapted to retain one, two or three CD's or DVD's stacked on each other. The packaging may comprise more than one such retaining member, such as two, e.g. one positioned on each side of the inner part.

When the retaining member is in the retaining position it may be possible to insert an object underneath the retaining member between the retaining member and the inner part and/or one of the first and second outer parts. If an object is inserted it may not be possible to move the retaining member towards the non-retaining position. This results in a situation wherein it is not possible to remove the element. Accordingly the packaging may in one embodiment comprise a security member adapted to retain the retaining member in the retaining position.

The security member may be shaped such that the packaging must be opened in order to access the security member. One advantage of such a packaging is that if the packaging is supplied with means for detecting whether or not the packaging has ever been opened, then one will know that if the product has not been opened then the security member will be present in the packaging. In other embodiments the security member can be inserted from the exterior of the packaging. Thus it is possible for a shop to insert the security member e.g. on arrival of the product. This makes it possible for a shop to use a security system of their own choice. Thus a shop is not forced to use the security member supplied by the supplier. The security member may be of the type described in U.S. D468 621.

In some embodiments the security member comprises signal emitting means. Such signal emitting means could be adapted to emit electromagnetic signals and/or magnetic fields. Thus when the packaging is moved out of a specific area e.g. out between two signal detecting means, it is possible to activate an alarm. As at least a part of the packaging is made of a metal material it is essential that the packaging does not shield the magnetic field and/or the electromagnetic signals. This may be done by removing the metal from an area such that the remaining metal is so thin that it is possible for the fields/signals to pass through the metal surface. In other embodiments an antenna may be provided. The antenna may be adapted to transmit the fields/signals from the inside of the packaging to the outside. In some embodiments the first and/or second outer part serves as the antenna and thus the ability of the metal part to transmit fields/signals may be utilised.

A part of the at least one of the elements can be integrated in the inner part. As an example a sleeve or cover of a book may be a part of the inner part. Such an integrated part may be separated from the rest of the inner part by a weakened line, which makes it possible to remove the integrated part by tearing it out or pushing it out of the inner part. The inner part may furthermore comprise means to retain such an element, which originally has been an integrated part of the inner part.

In some embodiments a foil is provided in the inner part and the foil must be removed in order to access the element. The removed foil may comprise information about the product in the packaging and thus means for holding the foil after removal can be provided e.g. in such a way that it is viewable from the outside of the packaging. The foil may be made such that it is possible to place it in a laser printer and thus it is possible to print information on the surface e.g. about music stored on an optical storage disc kept in the packaging.

At least a part of the inner part may be slidable in relation to the first and second outer part and/or other inner parts. The slidable part can be slidable between a protected position wherein it is stored in the packaging and an accessible position wherein it has been slid out of the packaging and thus is accessible. Such a slidable part could comprise a protruding part adapted to engage the stored element. The slidable part may be rotated out of the packaging. A plurality of slidable and/or rotatable parts may be provided in the packaging.

In some embodiments the inner part and/or the first and second outer parts may comprise magnetic properties. The magnetic properties make it possible to retain the element by means of a magnetic force. E.g. an optical storage medium made of a metal material which is attractable by the force of a magnet may be retained in a predetermined position. As an example the slidable part may be made of a plastic material comprising magnets in certain positions and when the part is slided out of the packaging the disc may be placed on the slidable part which holds the optical element by means of the magnets.

In one embodiment the stored element comprises an optical or electronical medium, such as an optical or electronical medium comprising a central hole. The diameter of the stored element may be between 119.7 and 120.3 millimeters or between 78.8 and 80.2 millimeters. In some embodiments the diameter of the element is between 10 and 500 millimeters, such as between 5 and 300 millimeters such as between 10 and 250 millimeters, such as between 20 and 200 millimeters such as between 50 and 150 millimeters, such as between 75 and 125 millimeters. The diameter of the centre hole of the optical storage medium may be between 15.25 and 15.35 millimeters or between 15.3 and 15.4 millimeters. In other embodiments the diameter of the centre hole is between 1 and 50 millimeters, such as between 5 and 25 millimeters, such as between 10 and 15 millimeters.

At least one side of the inner part may comprise a fixture for a CD(s). The fixture may engage the CD(s) in the centre hole or the outer edge of the disc.

A first outer dimension of the packaging may be between 135.1 and 136.8 millimeters. The first outer dimension may be the width of the packaging. A second outer dimension of the packaging may be between 190.2 and 192.0 millimeters. The second outer dimension may be the length of the packaging. A third outer dimension of the packaging may be between 14.7 and 15.3 millimeters. The third outer dimension may be the thickness of the packaging. In particular, the first and second dimension is important for the packaging in order to be packed in a traditional automated packing machine.

The automated packing machine will typically be of the type called Ilsemann KVD-30, Kyoto DVD100 and GIMA DVD872.

In some embodiments the first and/or the second and/or the third outer dimension is/are between 10 and 5000 millimeters, such as between 25 and 3000 millimeters, such as between 50 and 2000 millimeters, such as between 75 and 1500 millimeters, such as between 100 and 1250 millimeters such as between 150 and 1000 millimeters, such as between 175 and 750 millimeters, such as between 200 and 500 millimeters, such as between 300 and 400 millimeters.

However, in an alternative embodiment, the first outer dimension may be between 124.6 and 125.0 millimeters and/or a second outer dimension may be between 142.2 and 142.6 millimeters and/or a third outer dimension could be between 6.9 and 7.1 millimeters or between 10.2 and 10.6 millimeters. Such an embodiment may also be packed in an automated packing machine.

In some embodiments the first and/or second outer parts may comprise a decoration. The decoration may contain text, pictures, figures, drawing etc. and could contain information about the content of the packaging. If the content is a data-carrying medium the decoration may give details about the songs, files or movies contained on the medium. The decoration may cover all or a part of the packaging. Preferably, each side of the first and/or second outer part is decorated, so that decorations appear on both the inner and outer side of the packaging. The inner part is in this embodiment transparent in order to make the decoration on the inner side visible. This combination allows for unique possibilities of decorations and thus visual effects on the packaging.

One embodiment of the present invention may comprise a surface relief on an inner or outer surface of the packaging. Such a surface relief may be a hologram, a grating, a picture or any other kind of surface relief. The surface relief may be used for security purposes as it may prove the genuineness of the product. The surface relief may serve as identification of the product or as price information. The hologram may be readable for an optical reader and thus form part of an information package comprised in the packaging. The surface relief may be embossed in the surface of the first and/or second outer part. The process of embossing may be done by means of a roller or a stamping process.

The packaging may on a top or bottom edge be provided with embossed surface relief indicating the contents of the packaging, e.g. the name of the composer and the title of a data-carrying medium. Thus, the packaging can be distinguished from other packaging, if it is stacked on a shelf or in a drawer. The first and second outer part may comprise embossed surface relief and/or graphical printings on one or more surfaces both outside and/or inside the packaging.

The packaging may be adapted to comprise and accommodate a memory element readable by a computer, such as a memory card.

In some embodiments the surface relief is embossed with a device for processing a substrate, said device having a tool plan and a reaction plan, the tool plan comprising a multiple layer construction with:
a core having a substantially inflexible outer surface, and
at least one tool being attached to the surface of the core, wherein flexible force absorbing means is provided in at least a part of the tool plan and/or the reaction plan, so as to locally absorbing the forces applied by the planes. The flexible force absorbing means may be a double-sided adhesive tape, which is used to attach a tool to the tool plan.

The flexible properties of the tape are used to absorb local differences in the pressure applied. The method of embossing may be the one described in PCT/DK02/00787, which is hereby incorporated by reference.

The inner part i.e. one of the sides may be substantially transparent. Thus a decoration or a surface relief may be visible from both sides through the transparent material. This makes it possible to see information provided on the inside or outside surface of the first and second outer part. In order to provide further visual effects the inner part can comprise a transparent colour. In some areas the colour may be solid i.e. such that it is not possible to see through the colour while in other areas the colour may be transparent. If e.g. a surface relief is provided on the inner surface of the first and second outer part then the transparent colour may give the visual effect of colouring of some of the areas of the surface relief. Colours may further be provided on the surface relief and/or the decoration. Thus the designer will be provided with the possibility of providing colour directly over the decoration and/or surface relief. Another option is that he may provide the colours distanced from the decoration and/or surface relief by providing it on the inner part. The inner part may be provided with text, logos, marks, frosting/grinding, super transparent surfaces, or it may be decorated, provided with labels, holograms or metal layers.

According to a second aspect, the present invention relates to a retaining member for retaining a data carrying medium comprising a central hole in a packaging, the member comprising a plurality of taps adjacently arranged on a circle on a base part and surrounding a release tap, the taps being adapted to engage an edge of said hole, the taps being elevated positioned in relation to said base part, such that the taps are adapted to be released from the medium upon pushing the release tap towards said base part.

Preferably, the medium comprises a CD or DVD, and the retaining member may be adapted to retain one, two or three stacked CD's or DVD's.

According to a third aspect, the present invention relates to a packaging adapted to store an element, the packaging comprising one or more outer parts and one inner part, the inner part comprising a first side and a second side interconnected by a hinging part, and wherein an outer part is attached to the first and/or second side, respectively.

The outer parts may be attached to the sides, respectively, by means of glue and/or welding and/or a snap-lock, or they may be integrated with the inner part by means of moulding, curling, bending or likewise.

The inner part may be made of plastic, such as transparent plastic or coloured plastic, and the outer parts may be made of metal.

The inner part may comprise indentations along a circumference for receiving corresponding protrusions provided on the outer parts, so as to provide a click-on attachment therebetween. The outer parts are preferably U-shaped, the legs of the U-shape comprising said protrusions. Thus, the outer parts are clicked on to the inner part which may be an inner part according to the invention, or another inner part.

The inner part may comprise recesses on each side having a shape and depth substantially corresponding to the shape and thickness of the outer parts, respectively.

The shape of the outer parts is provided by bending or extruding.

The packaging according to each of the various aspects may comprise any of the features mentioned in connection with the other aspects.

BRIEF DESCRIPTION OF THE FIGURES

An embodiment of the invention will now be described in details with reference to the drawing in which:

FIG. 3 shows a sectional view of the packaging,

FIGS. 13-22E shows pictures of the packaging, FIG. 23 shows a packaging with preferred dimensions in order to be packed in a packing machine, FIG. 24 shows a prior art packaging.

DETAILED DESCRIPTION OF THE FIGURES

Figure 1:
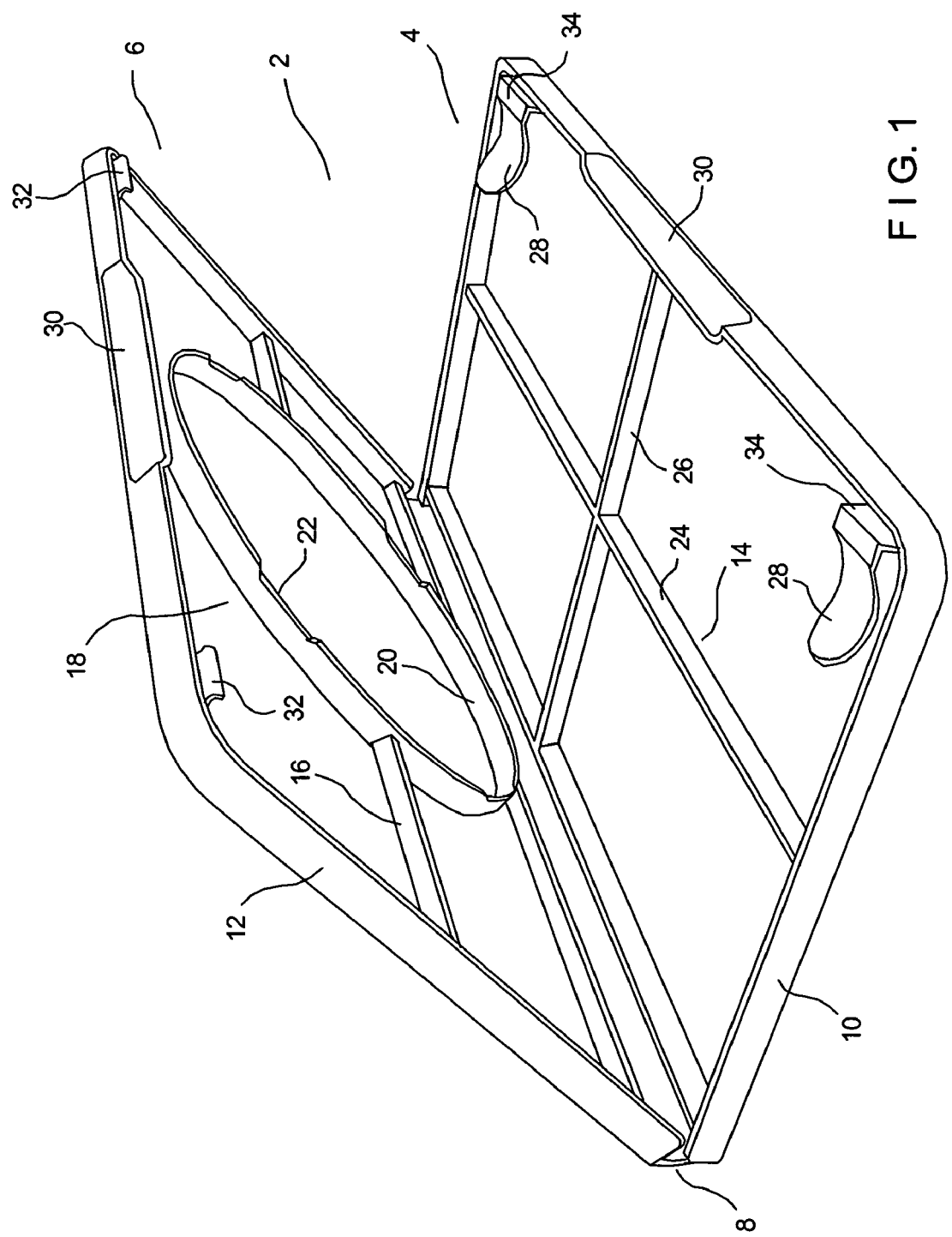
FIG. 1 shows an open packaging.

FIG. 1 is shown a packaging 2 comprising an inner part with a first side 4 and a second side 6 interconnected by a hinging part 8. The packaging 2 is openable like a book and thus the sides 4 and 6 may be swung away from each other like the covers of a book. A first outer part 10 is attached to the side 4 and a second outer part 12 is attached to the side 6. The side 4 further comprises a lower inner element 14, which is attached to the outer part 10. These two are glued together. In a similar way the second side 6 comprises an upper inner element 16 glued to the outer part 12. The outer part 10 and 12 are made of a metal material and the inner parts 14 and 16 are made of a plastic material. The upper inner element 16 is adapted to store an optical element by means of engaging means 18. The engaging means 18 is circular in shape and comprises an outer ring 20 and a retaining element in the centre of said ring (not shown). The outer ring 20 comprises an indentation 22, which makes it easier to grab the storage medium. The lower inner element 14 comprises longitudinal reinforcing 24 bar and a latitudinal reinforcing bar 26. The lower inner element 14 furthermore comprises two holding members 28 which are adapted to hold an element e.g. a booklet comprising information about the optical storage medium. The lower part 4 and the upper part 6 comprises handling indentations 30 which the user may use when the packaging is to be opened like a book. When opening the storage medium 2 the male locking member 32 disengages the female locking member 34.

Figure 2:
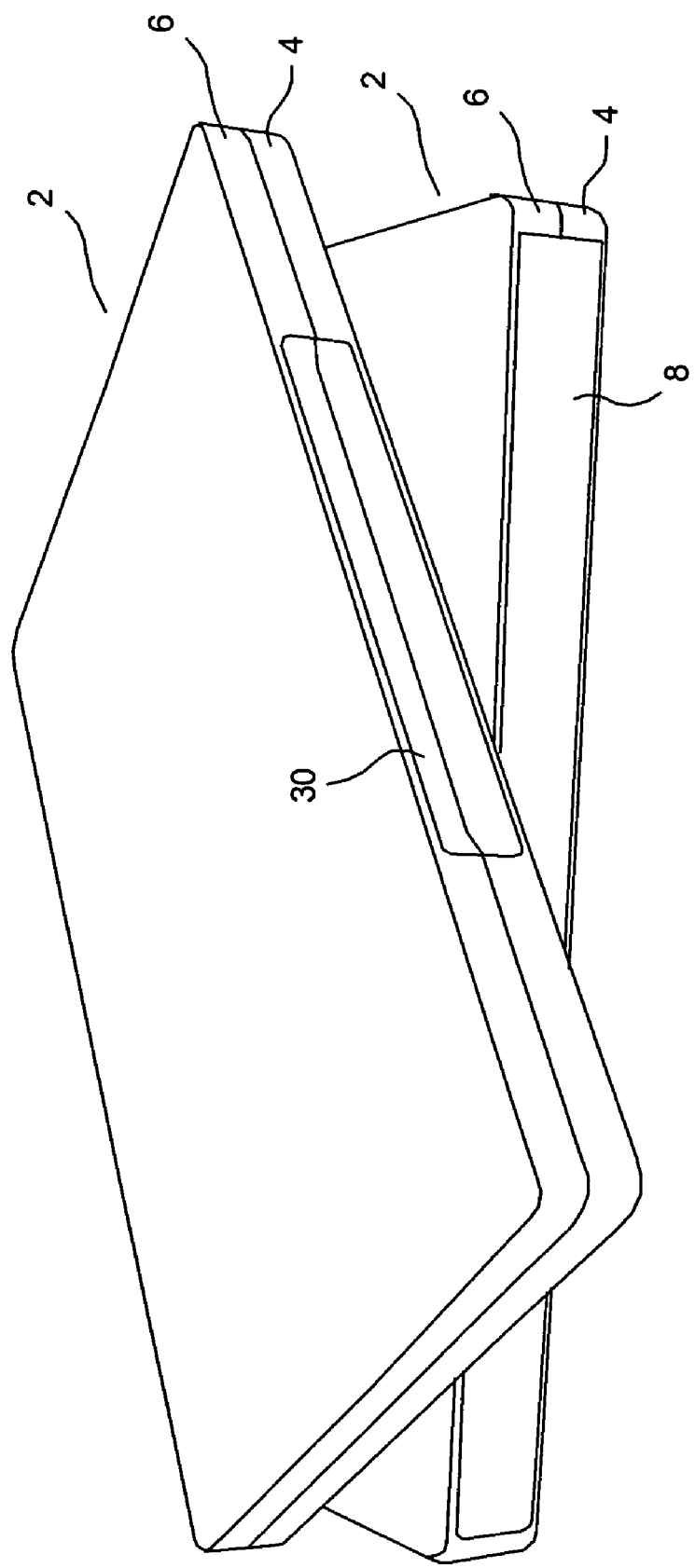
FIG. 2 shows two closed packaging according to the present invention.
Figure 4:
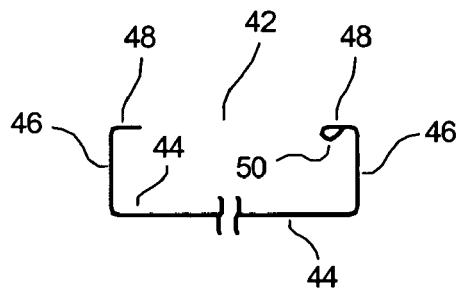
FIGS. 4-9 show different embodiments of attachment of the first and second sides and outer first and second parts.
Figure 5:
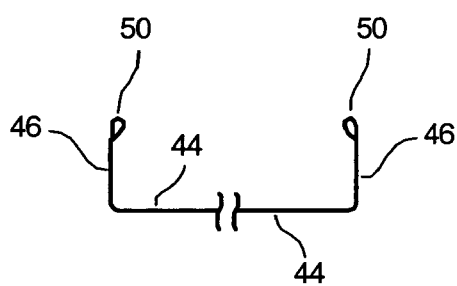
Figure 6:
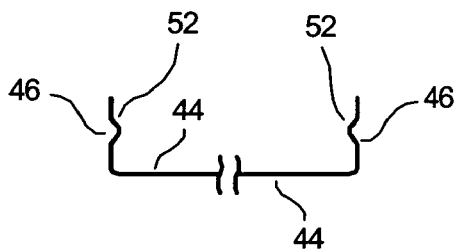

FIG. 2 shows two packaging 2 comprising a first side 4, a second side 6 and a hinging part 8. The packaging furthermore comprise handling indentations 30.

FIG. 3 shows a sectional view of the packaging 2, comprising a first side 4, a second side 6 and a hinging part 8. The figure shows the holding member 28, which is movable as shown by arrow 36. The male locking member 32 comprises a protruding part 38 which is adapted to engage the edge 40 of the female locking member 34. The handling indentations 30 are seen on the figure.

Figure 7:
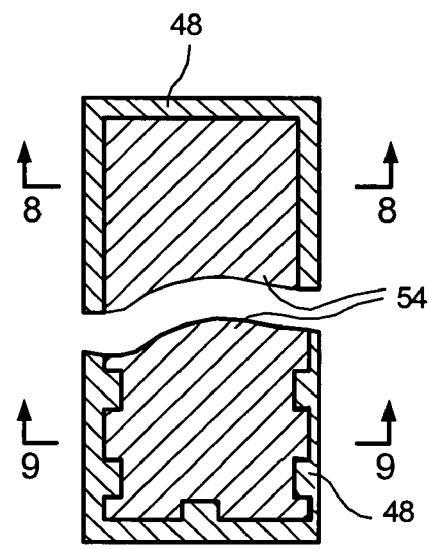
Figure 8:
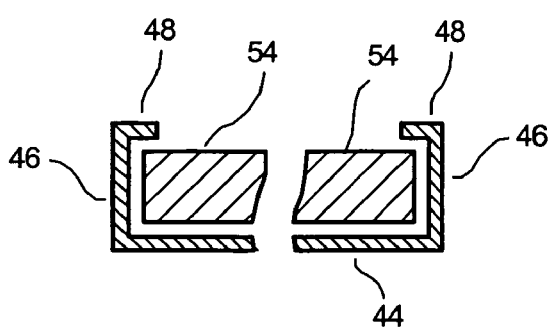
Figure 9:
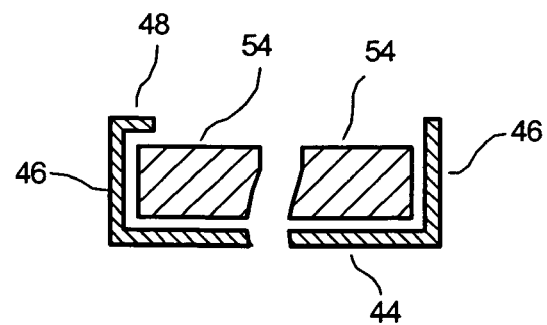

FIG. 4-9 shows different embodiments of first and/or second outer parts 42 having a middle part 44. The parts are made of a metal material, which is bend so as to provide a first flange 46 extending transverse or even perpendicular to the middle part 44. In some embodiments the first flange 46 is furthermore bend so as to define a second flange 48 which an inner element 54 must pass in order to be removed from the outer part 42, see FIGS. 7-9. In other embodiments the first flange 46 or the second flange 48 defines a curled edge portion 50. Yet in other embodiments the first flange 46 defines a protrusion 52. The protrusion 52, the curled edge portion 50 and the second flange 48 may be adapted to retain an inner element 54. In some embodiments the second flange 48 is provided along the entire periphery of the flange 46 as shown in FIG. 7 (A-A') and FIG. 8. In other embodiments the second flange 48 is provided in different locations along the first flange 48 as shown in FIG. 7 (B-B') and FIG. 9.

Figure 10:
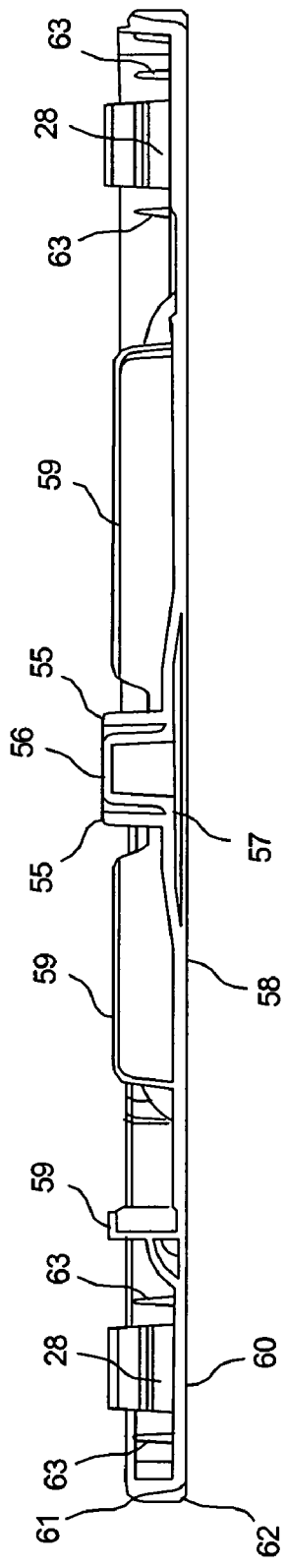
FIGS. 10-12 shows cross-sectional views of the packaging.

FIG. 10 shows a cross-sectional view of the side of the inner part 60 (such as the upper part 6 of FIG. 1) of the packaging 2 comprising an retaining member for engaging and retaining a CD or DVD. The retaining member has a plurality of retaining taps 55 adjacently arranged on a circle and surrounding a "release tap" 56. The taps 55 are adapted to engage an edge of a hole of a CD or DVD. The taps 55,56 are positioned elevated 57 in relation to the base 58 of the inner part, so that the taps may disengage said hole by pushing downwards on the release tap and thereby releasing the CD or DVD from the taps.

The engaging means further comprises a plurality of half-circles 59 that encircles the CD or DVD.

The edge portion 61 of the outer part 62 holds the inner part 60, and the sidewall of the inner part 60 comprises reinforcement ribs 63.

Figure 11:
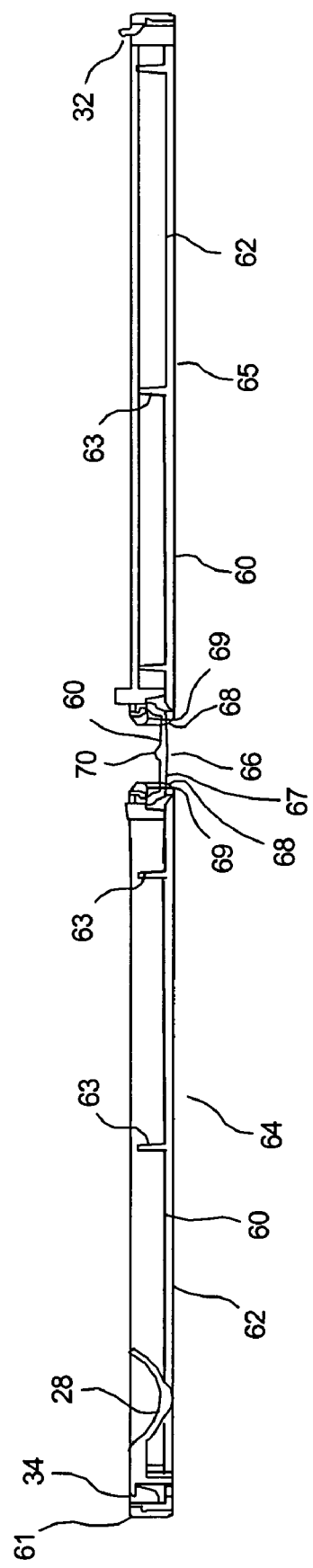

FIG. 11 shows a cross-sectional view of an open packaging comprising to sides 64 and 65 and a hinge part 66. One single inner part 60 constitutes both the left, right side and hinging part of the packaging. An outer metallic part 62 is attached onto one of the two sides of the inner part, and an outer metallic part 67 is attached to the hinge part of the inner part. Each of the outer metallic parts 62 comprises an edge portion 68 that constitutes the back edge of the packaging. The hinging part 66 is displaced a distance from the level of the metallic parts 62 such that when the packaging is closed, the hinging part 66 will be in line with the corners 69 of the metallic parts. When opening the packaging 2, the male locking member 32 disengages the female locking member 34. The hinging part comprises a reinforcement rib 70.

There is provided a small space between the outer parts 62 and the inner part 60 in order to provide space for embossed relief in the outer parts.

Figure 12:
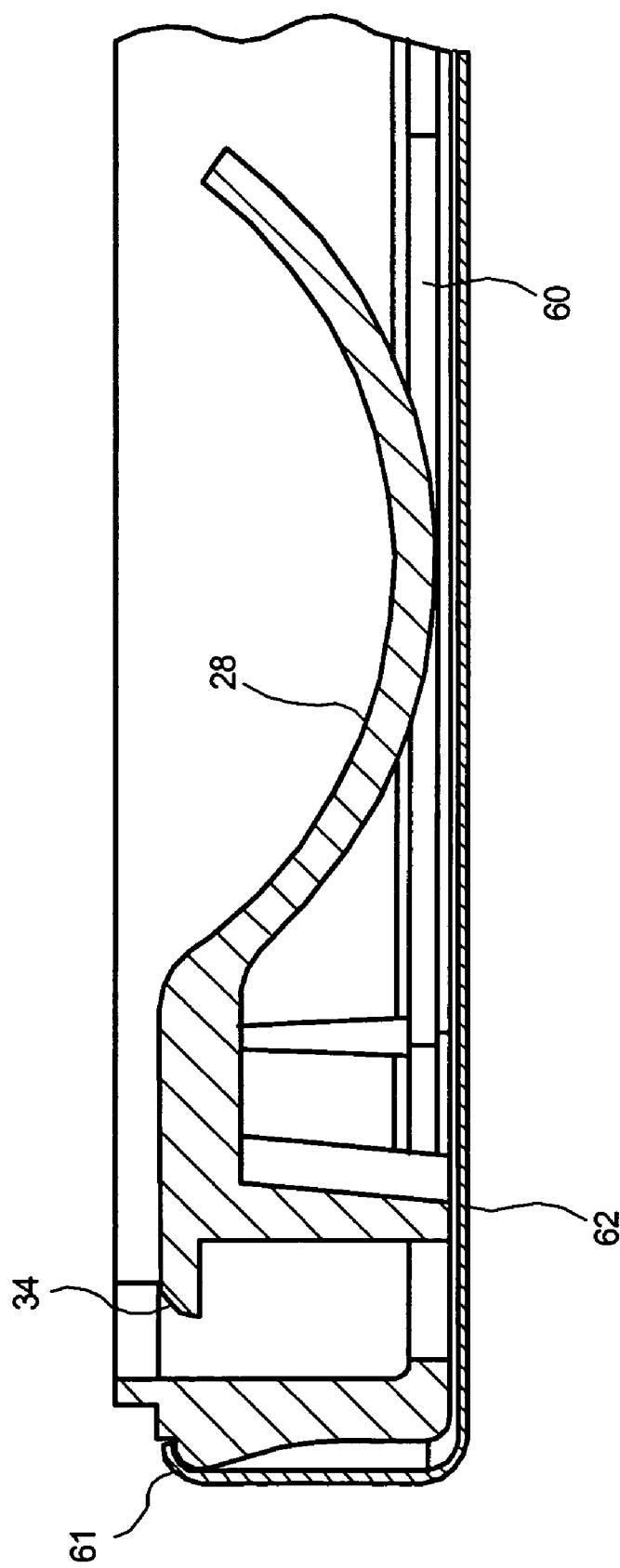

FIG. 12 shows a cross-sectional view of the holding member 28, which is movable as shown by the arrow 36.

Figure 13:
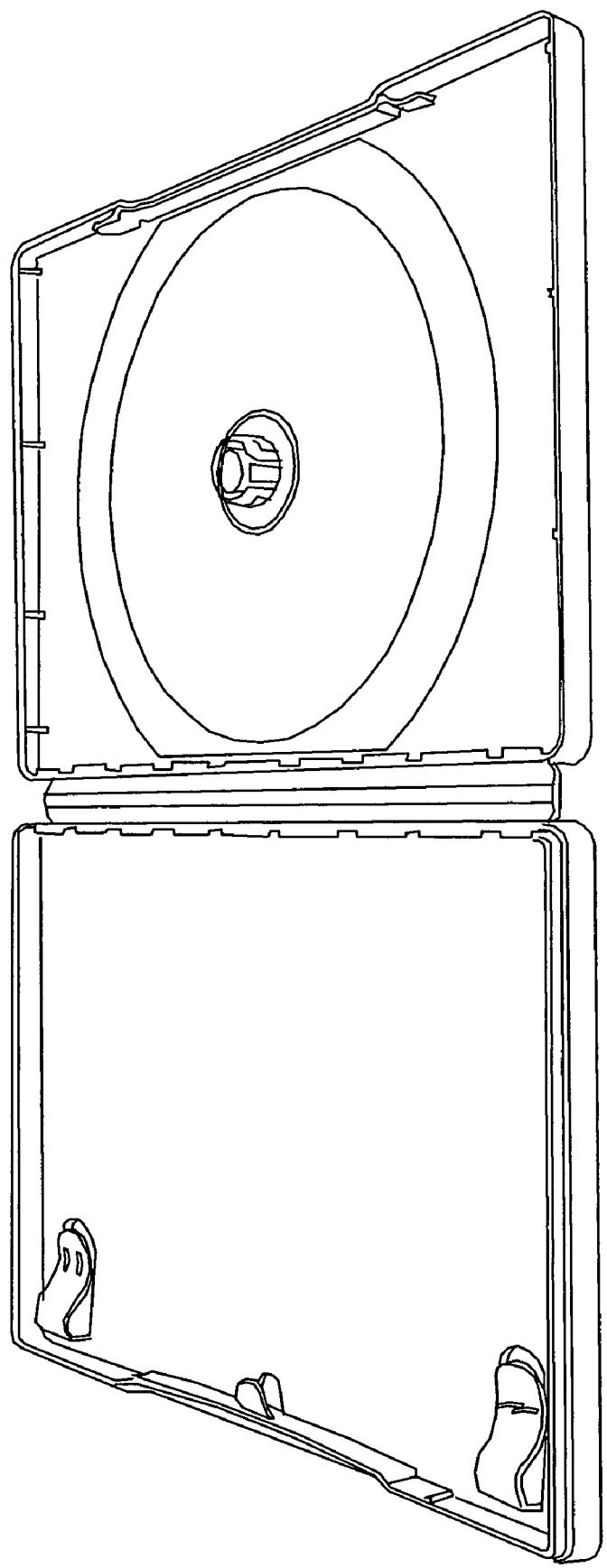

FIG. 13 shows the packaging in open condition.

FIGS. 14-15 shows the packaging in a closed condition from the front and backside, respectively. The back part 71 of the inner part composes the hinge connection between the two sides, and the back part is covered by a metal part/layer 72. As shown, the back edge is displaced inwards towards to internal area of each two side of the inner part so that the back part 71 be on level with the outermost edge 73 of the back side of the packaging when the packaging is closed. The handgrips 76 for opening the packaging are provided in the outer parts 62.

Figure 16:
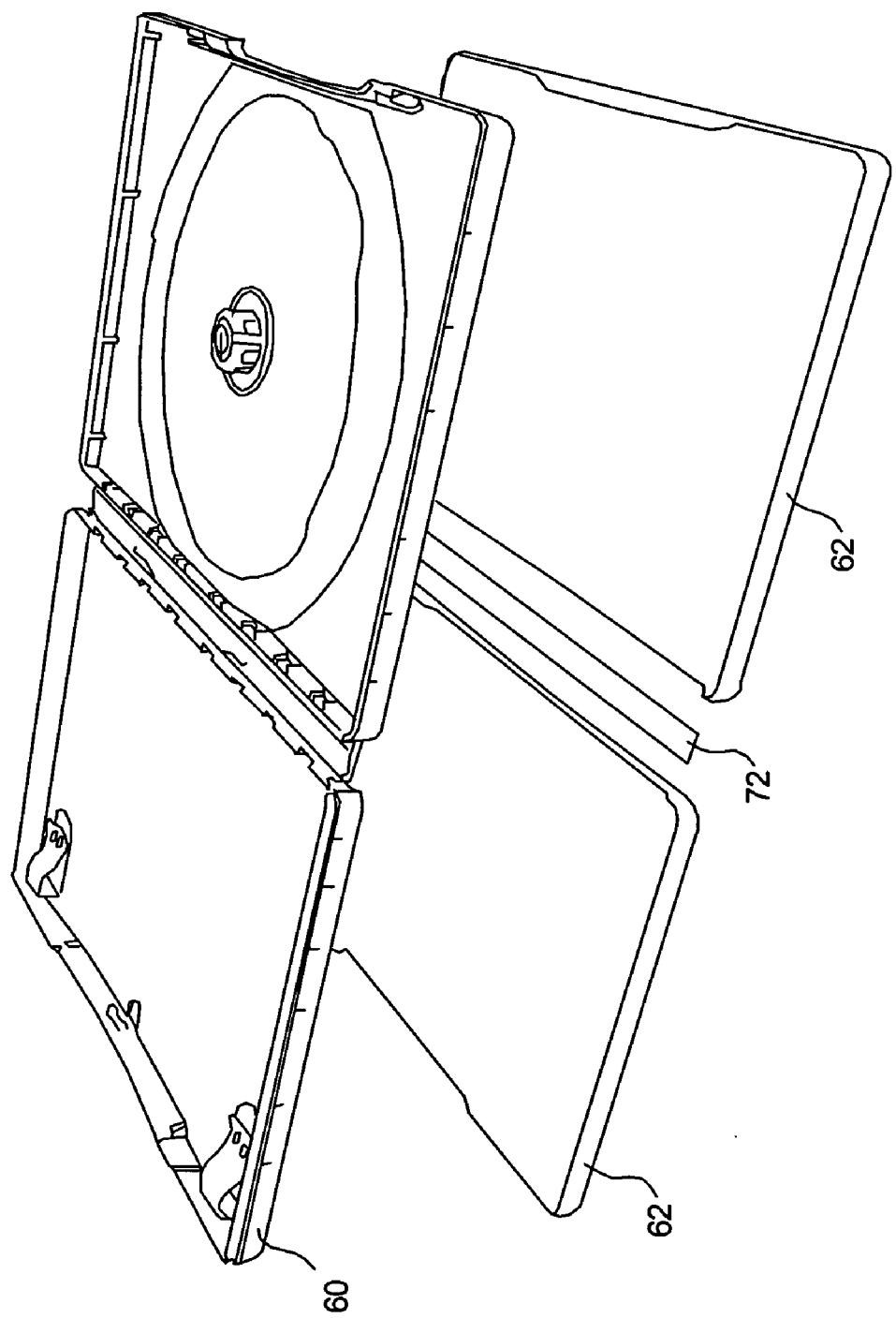

FIG. 16 shows the inner part 60 detached from the outer parts 62 and the metal layer 72.

Figure 17:
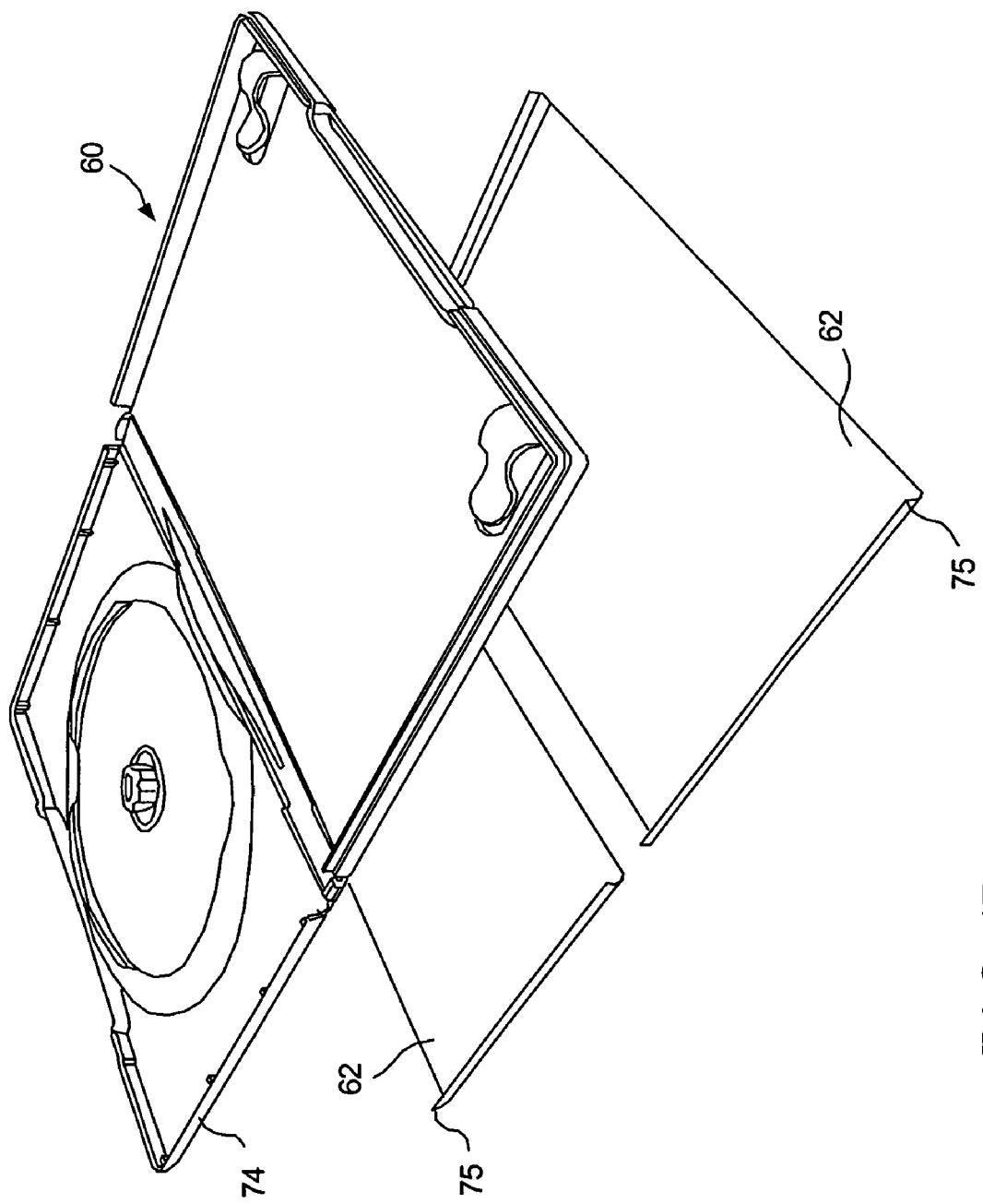
Figure 17A:
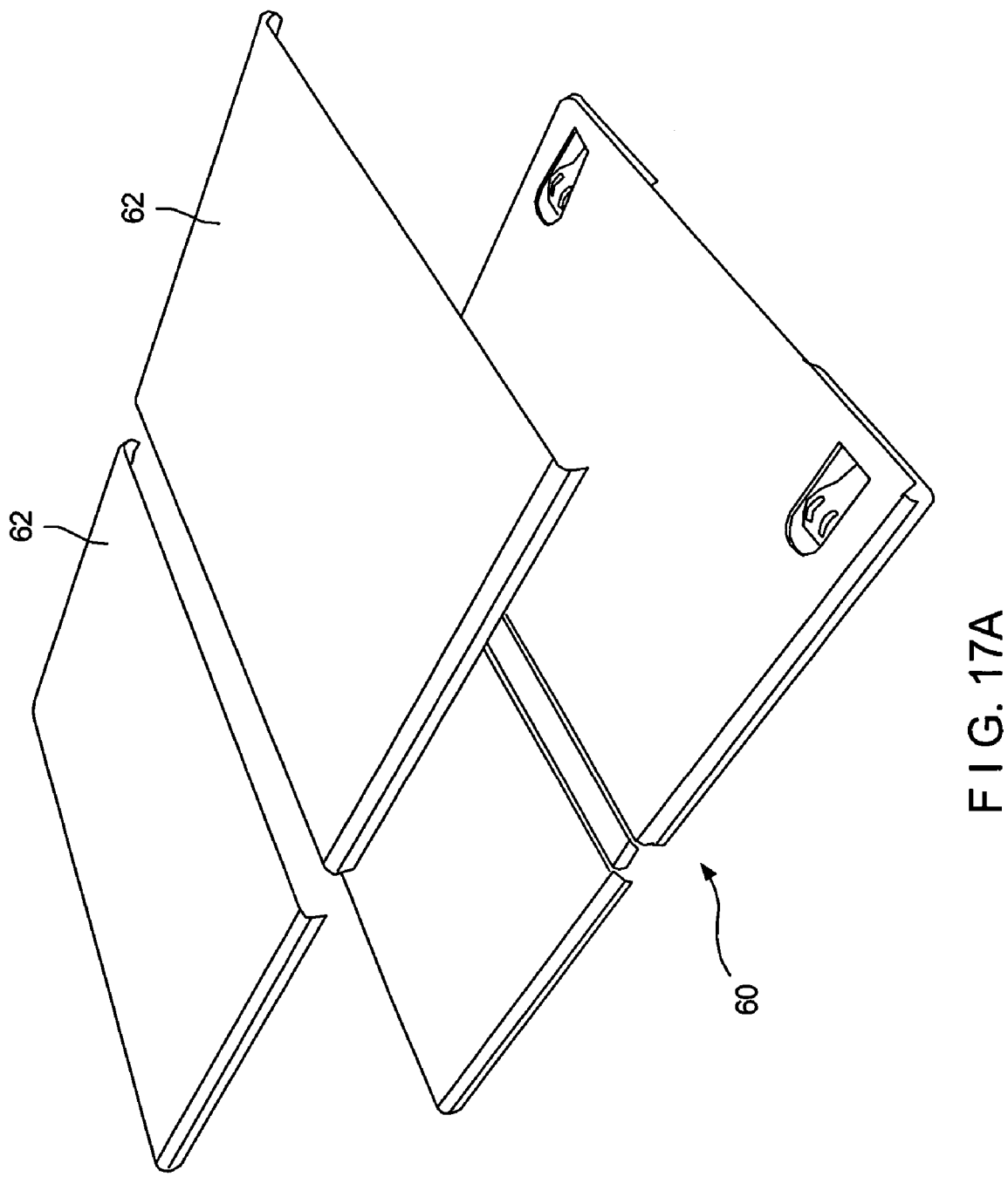

FIGS. 17 and 17A shows an inner part 60 detached from the outer parts 62, the outer parts comprising two U-shaped metal parts, which are clicked on to the inner part. The inner part 60 has indentations 74, which the legs 75 of the U-shaped metal parts may grip into when clicking them onto there.

Figure 18:
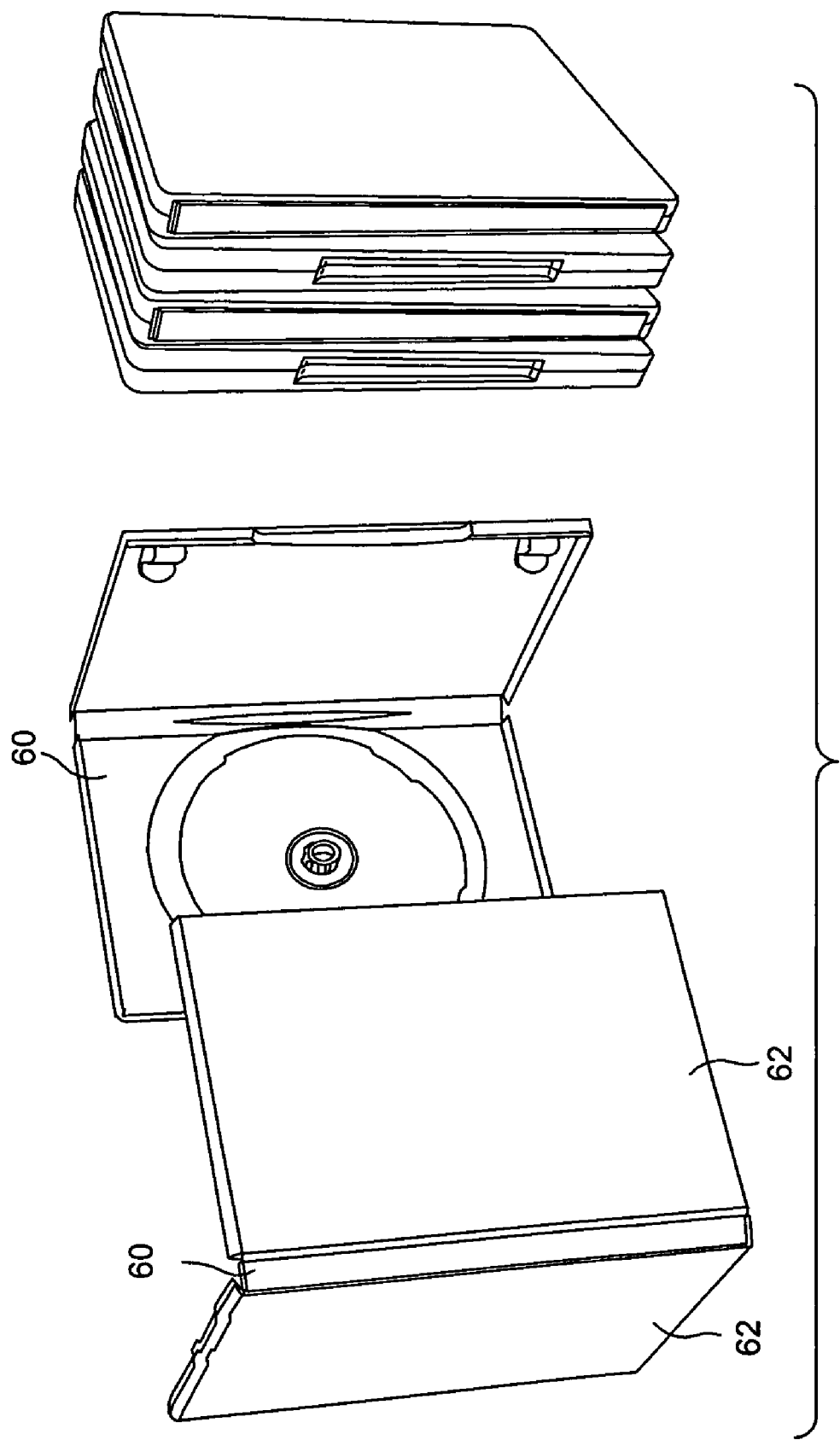

FIG. 18 shows an open packaging, where the outer parts 62 are clicked on to the inner part 60. A plurality of packaging stacked next to each other are also shown.

Figure 19:
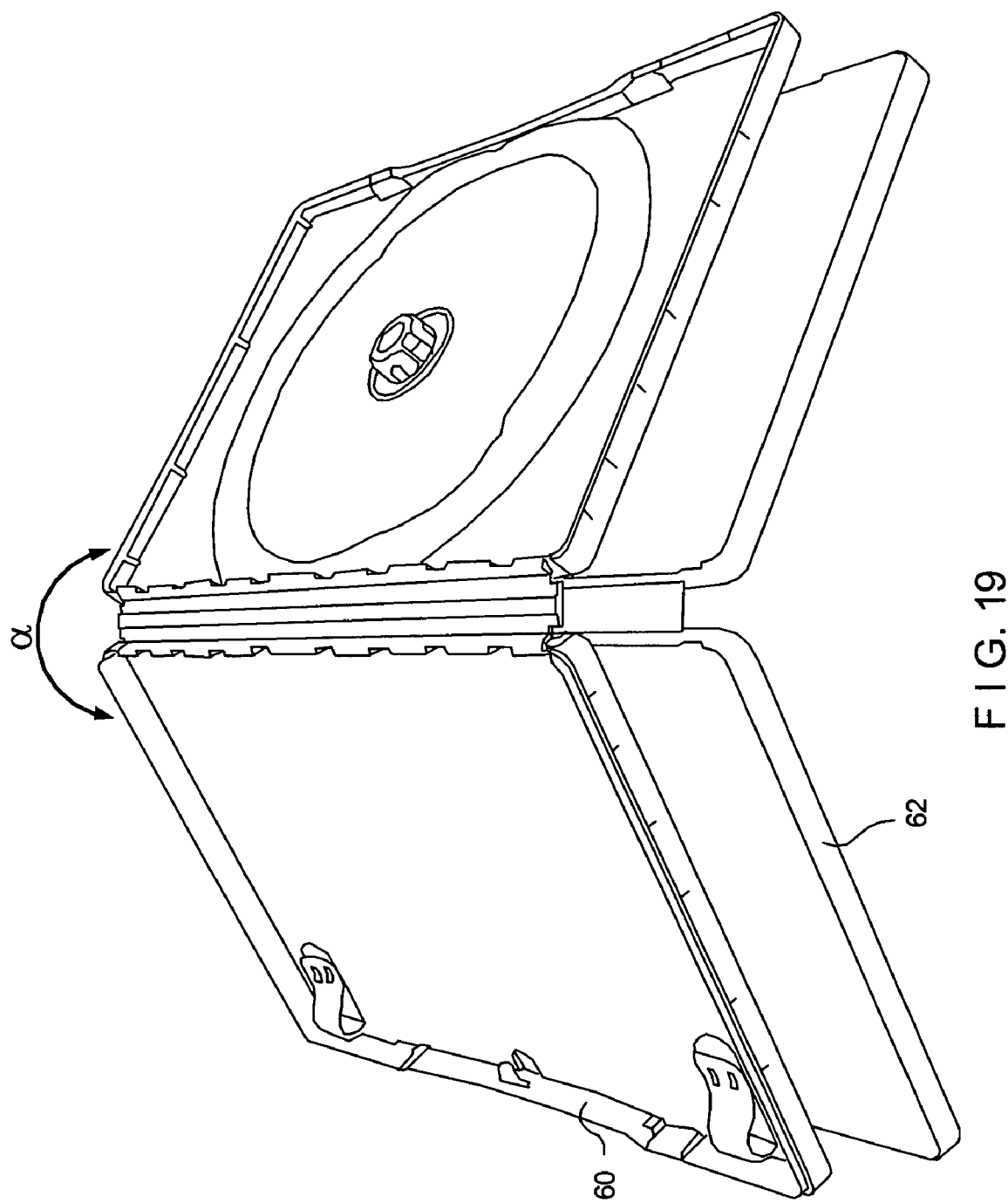
Figure 20:
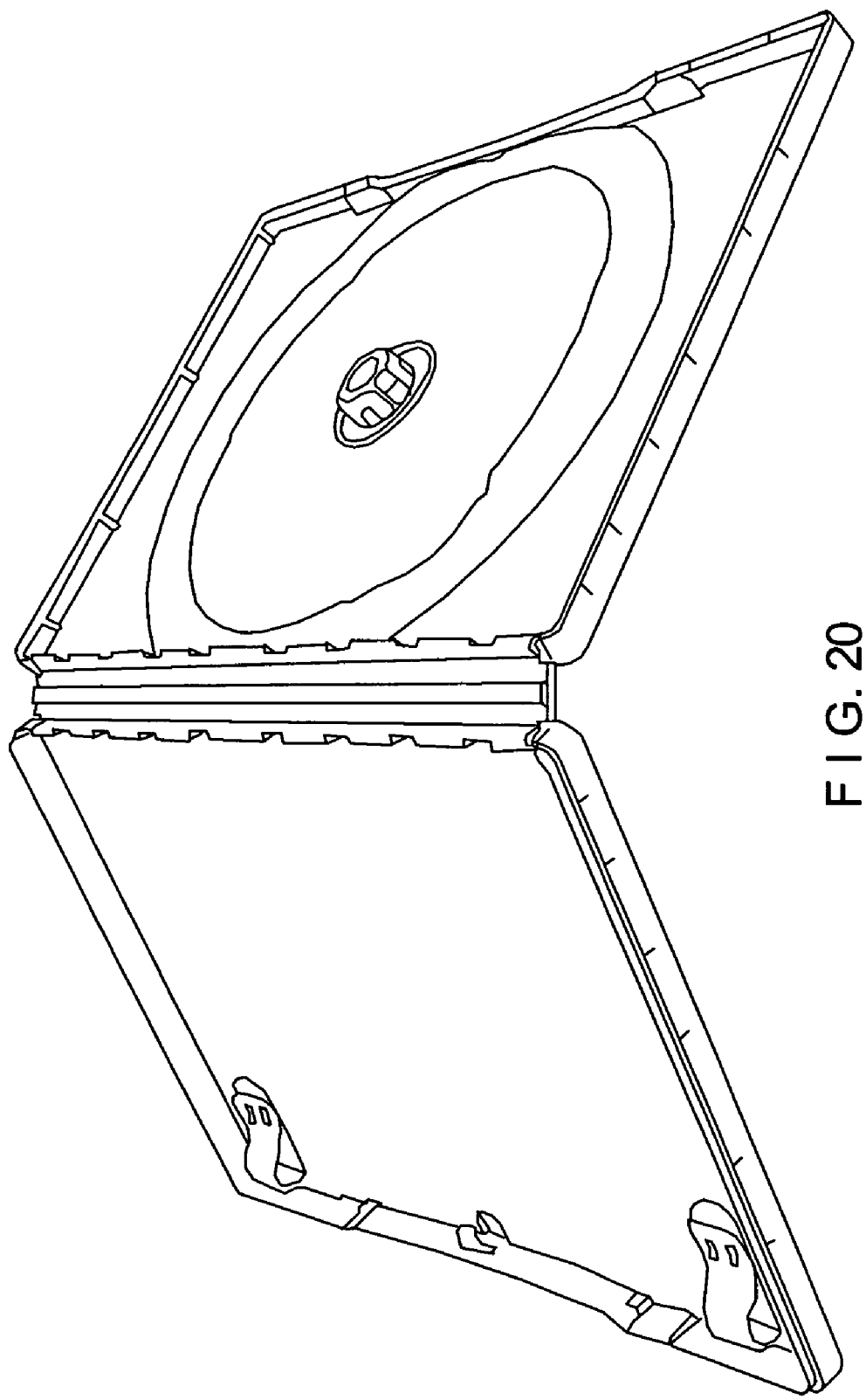

FIGS. 19-20 shows an open packaging, where the outer part 62 is clicked on to the inner part 60. As shown the packaging is opened like a book with an angle ($\alpha$) of more than 180°, preferably 240°. Thus, it is possible to put the packaging into a conventional packing machine for packing it.

FIG. 21 shows a cross-section of an embodiment of the packaging comprising an inner part with two sides 64, 65 and a back part 71 defining the hinging part with two hinges 77, one for each side of the inner part. The hinges 77 each defines a groove 78, said grooves being provided for clicking first and second outer parts 79 onto the inner part, as protrusion 80 provided as a bent edge on each outer may enter and engage the grooves 77, respectively. Also a metal layer/part (not shown) covering the back part may be attached to the back part by click on. Thus, any sharp edges on said outer parts and metal part/layer may be hidden or surrounded by said groove, and thus no sharp edges can be seen and touched. Preferably, the grooves extend along the entire length of the hinges so that the protrusions 80 may extend along the entire length of the edge of the outer parts and/or metal layer/part which reinforces said parts.

As seen in FIG. 21, when opening the packaging with an angle of 180° as shown, the level of the back part 71 between the two hinges is higher than the level of the two sides 64, 65 of the inner part. This embodiment provides that the back part may be displaced more inwards towards the internal of the packaging when the packaging is closed, which then increases the strength and provides a more smooth finish where the inner part is better covered by the outer metal parts.

FIGS. 22A-E shows an embodiment of the packaging according to the invention. The inner part 60 comprises locking pins 81 provided as protrusions for locking the first and second part 62 to the inner part 60. Said pins 81 are provided on the inner part 60 at the location adjacent to the indentations 82 on the first and second part 62, which defines the handgrips for opening the packaging. The pins 81 engage an edge portion 83 of the first and second part, respectively, in order to provide a lock therebetween, and thus prevent that the first and second parts 62 detach from the inner part 60 by accident.

FIG. 23 shows a packaging with preferred dimensions in order to be packed in an automated packing machine. Thus, the packaging according to the invention has been developed in order to fulfil these dimensions, said dimensions being preferably;

A: from 282 mm to 284 mm,
B: 191 mm ±0.8 mm,
C: 135.6 mm +0.9/−0.5,
D: 15 mm ±0.5, and
E: from 68.7 mm to 70.3 mm.

FIG. 24 shows a prior art packaging. The packaging is an example of the known packages, which cannot be bent more than approximately 190° ($\alpha$) and not up to 240°, and thus, it cannot be packed in an usual automated packing machine, as the packaging according to the invention.

Figure 25:
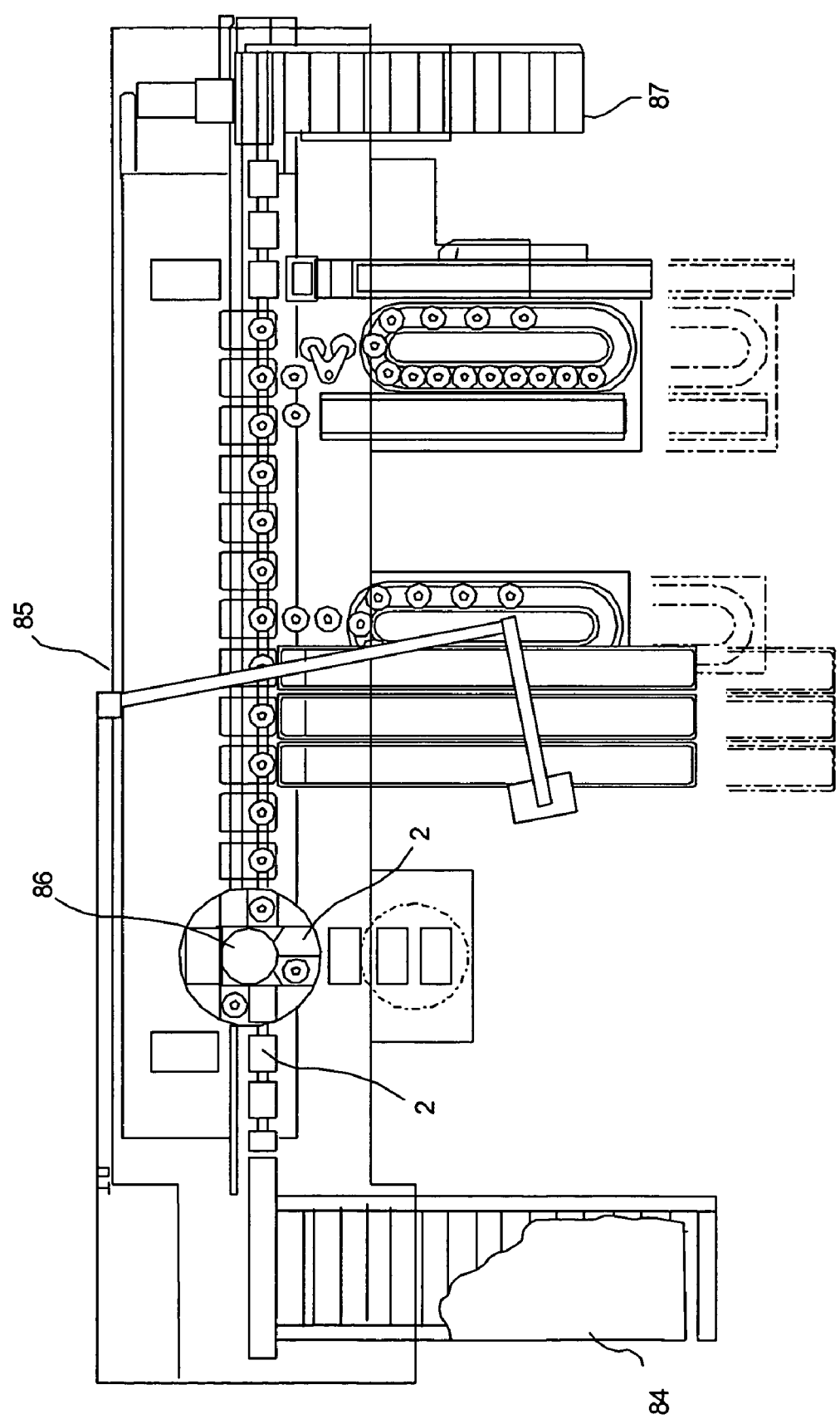
FIG. 25 shows an automated packing machine for packing the packaging according to the invention.

FIG. 25 shows an automated packing machine (Ilsemann) for packing a packaging 2 according to the invention. The empty packaging 2 is stored in a container 84 from where the packaging 2 is loaded to the conveyor 85. The packaging 2 is opened within an angle of approximately 180° and thereafter, a CD or DVD and other material is introduced into the packaging 2 by a rotating packing module 86 in which module 86 the packaging 2 is bent backwards into an angle of more than 180°, preferably 240°.

At the end of the conveyor 85, the packaging is closed and packed together with the other packaging and stacked in piles 87.

The invention claimed is:

1. A packaging comprising:
   first and second outer parts of metallic material,
   an inner part of non-metallic material made in one piece and comprising;
   first and second opposed sides between which an element can be stored,
   a hinging part forming at least one hinge connecting said sides and allowing the sides to be rotated relative to each other within an angle of more than 180° so as to open the packaging and adapting the packaging for packing in an automated packing machine, at least a part of a perimeter of the first and second outer parts being adapted to retain the inner part in order to attach said outer parts to the respective first and second sides of said inner part for covering a substantial part of outer surfaces of the first and second sides.

2. A packaging according to claim 1, wherein at least a part of the perimeter of the first and second outer parts comprises at least one of a curled edge portion and a flange extending transverse to a plane defined by a middle part of the parts.

3. A packaging according to claim 1, wherein the first and second sides comprise indentations along a perimeter for receiving corresponding protrusions provided on said first and second outer parts so as to provide the attachment between said sides and said outer parts.

4. A packaging according to claim 1 wherein the inner part comprises one or more protrusions to lock the first and second outer parts to the inner part.

5. A packaging according to claim 1, wherein the hinging part comprises two hinges, one for each side of the inner part.

6. A packaging according to claim 5, wherein the two hinges each define a groove on a backside of the packaging, each groove being adapted to engage with corresponding protrusions on the first and second outer parts for attaching these to the inner part.

7. A packaging according to claim 1, wherein the element to be stored comprises a data-carrying element.

8. A packaging according to claim 1, wherein the first and/or second outer part comprises a surface relief comprising one of a hologram, a grating, and a picture.

9. A packaging according to claim 8, wherein the surface relief is embossed with a device for processing a substrate, said device having a tool plane and a reaction plane, the tool plane comprising a multiple layer construction with:
   a core having a substantially inflexible outer surface, and
   at least one tool being attached to the surface of the core,
   wherein flexible force absorbing means is provided in at least a part of the tool plane and/or the reaction plane, so as to locally absorb the forces applied by the planes.

10. A packaging according to claim 1, wherein a part of the perimeter of the first and second outer parts comprises indentations to be used for opening the packaging.

11. A packaging according to claim 1, wherein at least one of the first and second sides and hinging part comprises one or more protrusions adapted to push the stored element towards the first or second side of the inner part, when the packaging is closed.

12. A packaging according to claim 1, wherein the first and second sides comprise guiding members for guiding the two sides in relation to each other upon closing the packaging.

13. A packaging according to claim 12, wherein the first side of the inner part comprises a guiding member comprising a male member having a tapered end adapted to engage into a female member positioned on the second side of the inner part.

14. A packaging according to claim 1, wherein a part of the first and/or second outer part comprises embossed surface relief indicating the content of the packaging.

15. A packaging according to claim 1, wherein at least one of the inner part and the first and second outer parts comprises locking means for keeping the packaging in a closed position.

16. A packaging according to claim 15, wherein the locking means comprises at least one of magnets and male/female locking means.

17. A packaging according to claim 1, wherein the first and second outer parts together cover entire surface of each of the sides of the inner part, respectively.

18. A packaging according to claim 1, wherein the hinging part allows the sides to be rotated relative to each other within an angle of 200° or more.

19. A packaging according to claim 1, wherein the inner part comprises a plurality of retaining members provided on the first and/or second side for retaining elements.

* * * * *